United States Patent [19]
Kodama et al.

[11] Patent Number: 5,963,673
[45] Date of Patent: Oct. 5, 1999

[54] METHOD AND APPARATUS FOR ADAPTIVELY SELECTING A CODING MODE FOR VIDEO ENCODING

[75] Inventors: Hideo Kodama, Warabi; Takashi Urano, Matsudo, both of Japan; Satoko Kobayashi, Medford, Mass.; Yasuhachi Hamamoto, Kawaguchi; Etsuko Sugimoto, Tokyo-to, both of Japan

[73] Assignee: Sanyo Electric Co., Ltd., Moriguchi, Japan

[21] Appl. No.: 08/769,252

[22] Filed: Dec. 18, 1996

[30] Foreign Application Priority Data

Dec. 20, 1995 [JP] Japan .................................. 7-331958
Mar. 27, 1996 [JP] Japan .................................. 8-072406

[51] Int. Cl.$^6$ .................................................. G06K 9/00
[52] U.S. Cl. .......................................... 382/239; 382/250
[58] Field of Search ...................... 348/412, 409, 348/415, 405, 407, 416, 394, 700; 395/114; 358/426, 261.1, 261.2, 261.3, 427, 261.4, 262.1, 428, 430, 432, 433; 375/244, 246; 382/232, 233, 234, 235, 236, 238, 239, 243, 244, 245, 246, 248, 250, 251, 252, 253

[56] References Cited

U.S. PATENT DOCUMENTS

| | | | |
|---|---|---|---|
| 4,866,510 | 9/1989 | Goodfellow et al. | 348/409 |
| 4,999,705 | 3/1991 | Puri | 358/136 |
| 5,210,605 | 5/1993 | Zaccarin et al. | 358/105 |
| 5,212,742 | 5/1993 | Normille et al. | 382/56 |
| 5,241,383 | 8/1993 | Chen et al. | 358/136 |
| 5,267,334 | 11/1993 | Normille et al. | 382/56 |
| 5,565,921 | 10/1996 | Sasaki et al. | 348/412 |
| 5,576,765 | 11/1996 | Cheney et al. | 348/412 |
| 5,602,592 | 2/1997 | Mori et al. | 348/415 |

FOREIGN PATENT DOCUMENTS

| | | | |
|---|---|---|---|
| 2-029180 | 1/1990 | Japan | H04N 7/137 |
| 2-222389 | 9/1990 | Japan | H04N 7/137 |
| 3-040687 | 2/1991 | Japan | H04N 7/137 |
| 4-040193 | 2/1992 | Japan | H04N 9/77 |
| 4-079484 | 3/1992 | Japan | H04N 5/232 |
| 4-145777 | 5/1992 | Japan | H04N 5/232 |
| 4-207790 | 7/1992 | Japan | H04N 11/04 |
| 4-215384 | 8/1992 | Japan | H04N 7/13 |
| 4-234276 | 8/1992 | Japan | H04N 7/00 |
| 5-137129 | 6/1993 | Japan | H04N 7/133 |
| 6-133301 | 5/1994 | Japan | H04N 7/137 |

*Primary Examiner*—Bijan Tadayon
*Attorney, Agent, or Firm*—Armstrong, Westerman, Hattori, McLeland & Naughton

[57] ABSTRACT

A method and apparatus for adaptively selecting a coding mode for video encoding systems using the techniques of predictive coding, interpolative coding, motion compensation, discrete cosine transformation (DCT), adaptive quantization, or variable length coding. In one system, a value related to an amount of total code, which is composed of current video code and its coding parameters for each of the above coding modes, is determined, respectively, and a coding mode corresponding to the smallest value is selected. Then, the encoding is performed using the selected coding mode.

36 Claims, 18 Drawing Sheets

METHOD AND APPARATUS FOR ADAPTIVELY SELECTING A CODING MODE FOR VIDEO ENCODING

BACKGROUND OF THE INVENTION

1. Field of the Invention

The present invention generally relates to motion video encoding techniques and, more particularly, to techniques for adaptively selecting a coding mode. The present invention relates to, for example, MPEG encoders.

2. Description of the Related Art (1)Techniques for Encoding Video Data

Predictive/interpolative coding, motion compensation, DCT (Discrete Cosine Transformation), quantization, or VLC (variable length coding) are in use for video coding systems.

In predictive coding, a current macroblock is compared with the reference macroblock and the difference between them is output to the DCT. The current macroblock is a block having 16×16 pels and is extracted from a current frame. The reference macroblock is a block having 16×16 pels and is extracted from a reference frame. The reference frame is a frame preceding the current frame or following the current frame. If the reference frame precedes the current frame, the predictive coding is called forward. If the reference frame follows the current frame, the predictive coding is called backward. If two reference frames, forward and backward, are used for the prediction and the average of the results is employed, the coding is interpolative.

As described above, the reference macroblock is extracted from the reference frame. This reference macroblock is desirably approximate to the current macroblock. Accordingly, the macroblock having the smallest predictive error is extracted from the reference frame, for example. The relative position of the above reference macroblock in the reference frame is usually different from that of the current macroblock in the current frame. This difference between the two positions is designated by a motion vector. The difference between each pel in the current macroblock and the corresponding pel in the reference macroblock, which is designated by the motion vector, is output to the DCT. This compensation is called "motion compensation".

In the DCT, a current block having 8×8 pels is converted to an 8×8 coefficient matrix Cij by using the DCT technique, and output to the quantizer. Here, the above current block is obtained by splitting the difference macroblock as shown in FIG. 3.

As shown in FIG. 4, the coefficient matrix Cij is divided by a certain divisor Qij ((quantizer scale q)×(constant Kij proper to each coefficient Cij)), and the remainder is rounded off, and the quantized coefficient C'ij is zigzag scanned and then output to the variable length coder. Here, the constant Kij is given in a quantization matrix table.

When the value of the Kij and/or the q increases, the quantized coefficient data C'ij output from the quantizer contains more "0"'s and the compression rate rises. In the adaptive quantization, a bit rate of a bitstream output from the video encoder is monitored, and the quantizer scale is set such that the bit rate can meet the target value. That is, when the bit rate is less than the target value, the quantizer scale q is controlled to be smaller, and when the bit rate is greater than the target value, the quantizer scale q is controlled to be larger.

In the above variable length coding, e.g., Huffman coding, each quantized coefficient C'ij output from the quantizer is allocated a code having a length according to its frequency of occurrence.

(2)MPEG

One type of video compression system is proposed by the Moving Pictures Expert Group (MPEG), a committee within the International Standards Organization (ISO). The MPEG1 standard is given in the ISO/IEC11172, and the MPEG2 standard is given in the ISO/IEC13818.

The MPEG system integrates a number of well-known data compression techniques into a single system. These include motion-compensated predictive/interpolative coding, DCT, adaptive quantization, and VLC.

As shown in FIG. 2, I, P, and B-pictures are in use in the MPEG standard. The I-picture is composed of intra-macroblocks coded by only DCT, quantization, and VLC. That is, the above mentioned motion-compensated predictive/interpolative coding is not used for the I-picture. The I-picture is decoded without requiring any motion vectors.

The P-picture is composed of the intra macroblocks and forward predictive macroblocks. The P-picture is decoded using motion vectors from a preceding I or P-picture. The B-picture is composed of the intra macroblocks, forward predictive macroblocks, backward predictive macroblocks, and interpolative macroblocks. The B-picture is decoded using motion vectors from both preceding I or P-picture and following I or P-picture.

(3)Coding Mode

Six types of motion compensation, frame MC, field MC, and dual-prime MC, each for frame-construction, and field MC, 16×8 MC, and dual-prime MC, each for field-construction, are permitted in the MPEG standard.

Three types of predictive direction, forward direction, backward direction, and dual (forward and backward) direction, are permitted in the MPEG standard.

Accordingly, there are plural types of motion compensation modes in the MPEG standard. The number of the motion vector is dependent on the motion compensation mode.

Predictive coding mode without motion compensation and intra coding mode are permitted in the MPEG standard.

Accordingly, there are plural types of coding modes in the MPEG standard. In the coding, a suitable coding mode is selected for each macroblock from among the permitted coding modes. For example, in the inter picture predictive coding, the coding mode having the smallest predictive error is selected, and when the smallest predictive error exceeds the predetermined threshold, the intra coding is selected. Here, the predictive error is, for example, the mean square error ofthe difference between the current macroblock and the reference macroblock, or the mean absolute difference between them.

(4)Prior Art

As prior art related to the detection of the motion vector, there have been techniques disclosed in Japanese Unexamined Patent Publications Nos. 4-145777, 4-79484, 3-40687, 4-207790, 4-234276, and 4-40193, for example.

As prior art related to the decision circuit which selects either the intra coding or the inter-picture coding, there have been techniques disclosed in Japanese Unexamined Patent Publications Nos. 6-133301 and 5-137129, for example.

As prior art related to the total amount of code output from the encoder which comprises the motion-compensated predictive/interpolative coder, the DCT, the adaptive quantizer, and the VLC, there have been techniques disclosed in Japanese Unexamined Patent Publications Nos. 4-215384, 2-29180, and 2-222389, for example.

SUMMARY OF THE INVENTION

In the conventional video encoder, the motion compensation mode having the smallest predictive error is selected.

However, the above mode is not always suitable. In some cases, the total amount of output code of the above mode is larger than the other coding mode because the code output from the video encoder is composed of video code, coding parameters such as motion vector code, macroblock type code, quantizer scale code, and so on. Accordingly, if the amount of the motion vector code is large enough, the total amount of code output from the video encoder becomes larger than the other cases.

According to one aspect of the present invention, the motion compensation mode is selected with reference to the total amount of code, which includes coding parameters such as motion vector code output from the encoder.

When the quantizer scale is large, the total amount of code output from the video encoder may become small, and the visual appearance may become degraded. Therefore, as for the degradation of the reconstructed picture, when the quantizer scale is large, there is little difference between the picture reconstructed by using the motion compensation mode having the minimum predictive error and the picture reconstructed by using another motion compensation mode.

When the buffer is heading toward overflow, the quantizer scale is controlled to be increased. However, if the quantizer scale is varied over the picture, the visual appearance of the local area of the picture may be degraded, and this local degradation may cause the whole degradation. In other words, increase of the coding parameters, such as the motion vector code, may cause the whole degradation of the picture.

According to another aspect of the invention, the coding mode such as the motion compensation mode is determined with reference to compression rate, quantizer scale, buffer fullness, motion vector code, macroblock type code, or the like.

DETAILED DESCRIPTION OF THE EXEMPLARY EMBODIMENTS

Although this invention is described in terms of an MPEG video encoder, it is contemplated that it may be used with other types of video encoders in which image frames are encoded, based, in part, on motion-compensated prediction or adaptive quantization.

(1)An Exemplary MPEG Encoder

Figure 1:
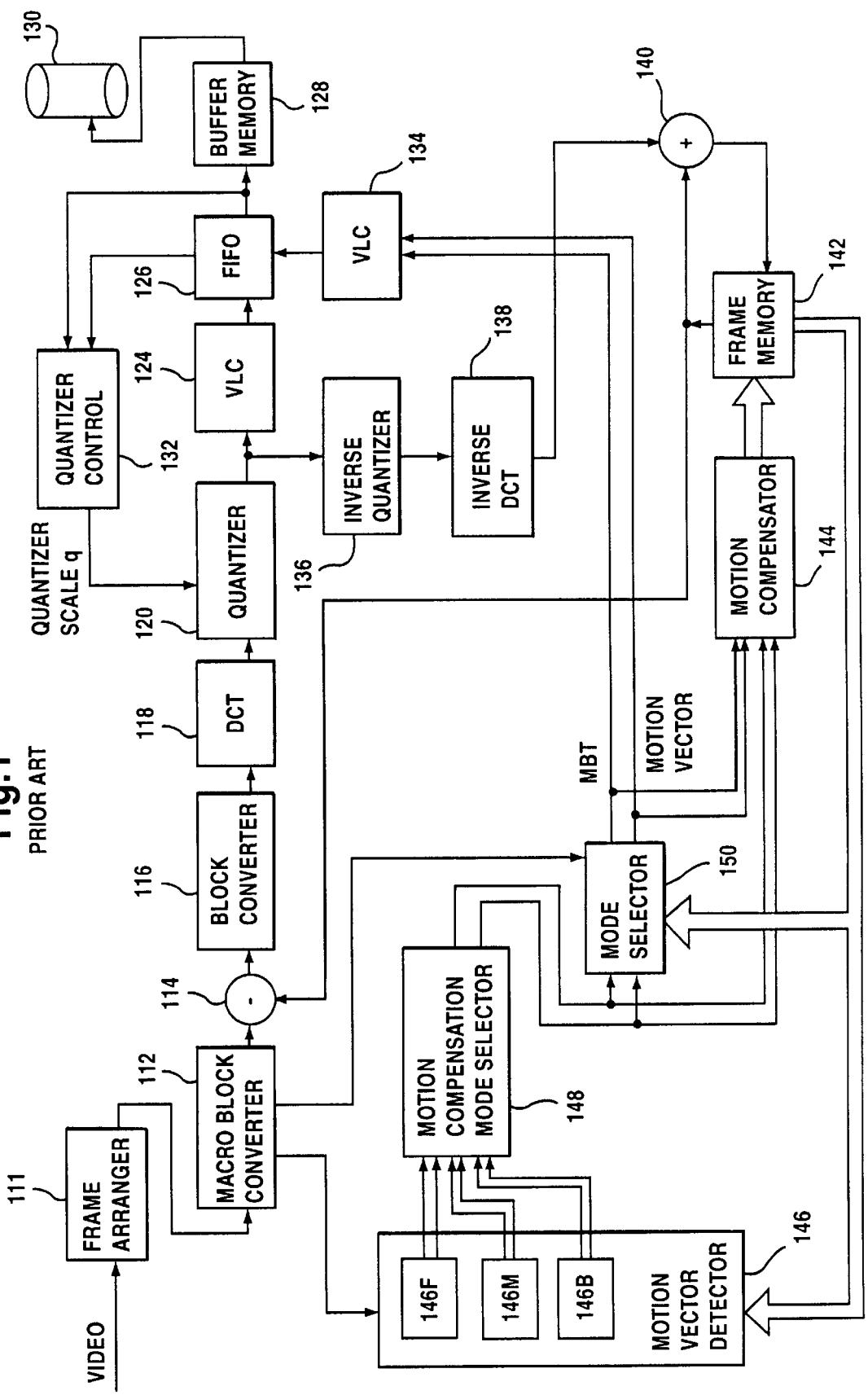
FIG. 1 is a block diagram of an exemplary video encoder.
Figure 2:
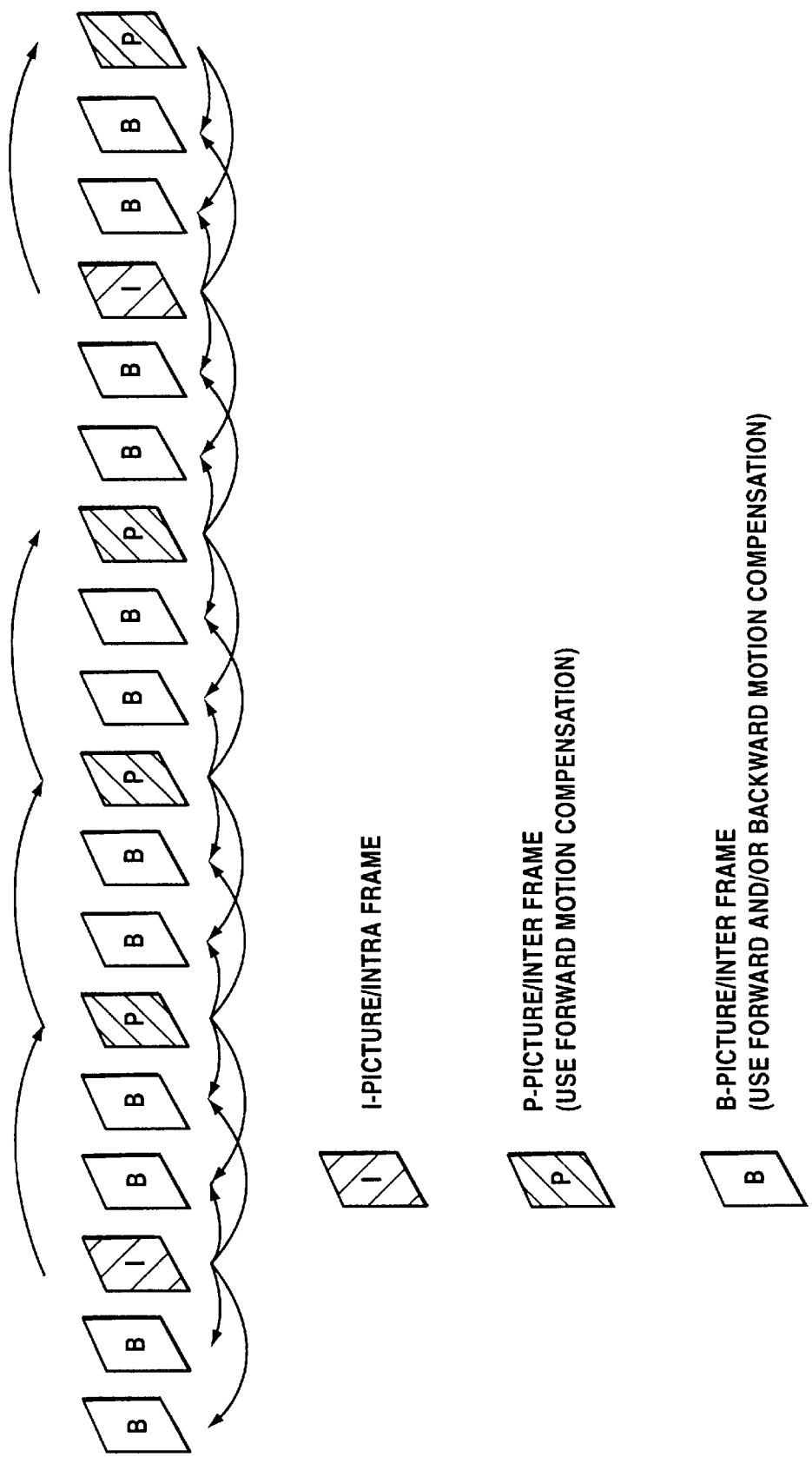
FIG. 2 shows an arrangement of the I, P, and B-pictures.

An exemplary MPEG encoder is shown in FIG. 1. In this system, a video signal which describes an image is provided to a frame arranger 111. The frame arranger 111 arranges the frame order. If the current frame is referenced by the frame preceding in time, the current frame should have been decoded and stored in a frame memory 142 precedingly, therefore, the current frame and the frame preceding in time are arranged so that the current frame can be processed first. For example, the current I or P-picture referenced by the B-picture preceding in time is output to a macroblock converter 112 precedingly.

The video data arranged by the frame arranger 111 is applied to the macroblock converter 112. The macroblock converter 112 which may include, for example, a conventional dual-port memory, converts the signal from raster scan format to a macroblock format of 16×16 pets to output to a subtracter 114 and a motion detector 146. The macroblock converter 112 outputs a macroblock (a current macroblock, or video data of current macroblock) to the subtracter 114 and the motion detector 146. In the macroblock format, each frame of the image is represented as a collection of macroblocks where each macroblock has 256 pels arranged as a matrix of 16 horizontal pels by 16 vertical pets. The macroblock converter 112 provides these pixel values one macroblock at a time to a subtracter 114.

In non-intra coding mode, the subtracter 114 subtracts a reference macroblock provided by the frame memory 142 from a corresponding current macroblock provided by the macroblock converter 112 to output a difference macroblock representing motion-compensated differentially-coded macroblock to a block converter 116. In intra coding mode, the subtracter 114 output a current macroblock of data representing the macroblock provided by the macroblock converter 112 to the block converter 116.

Figure 3:
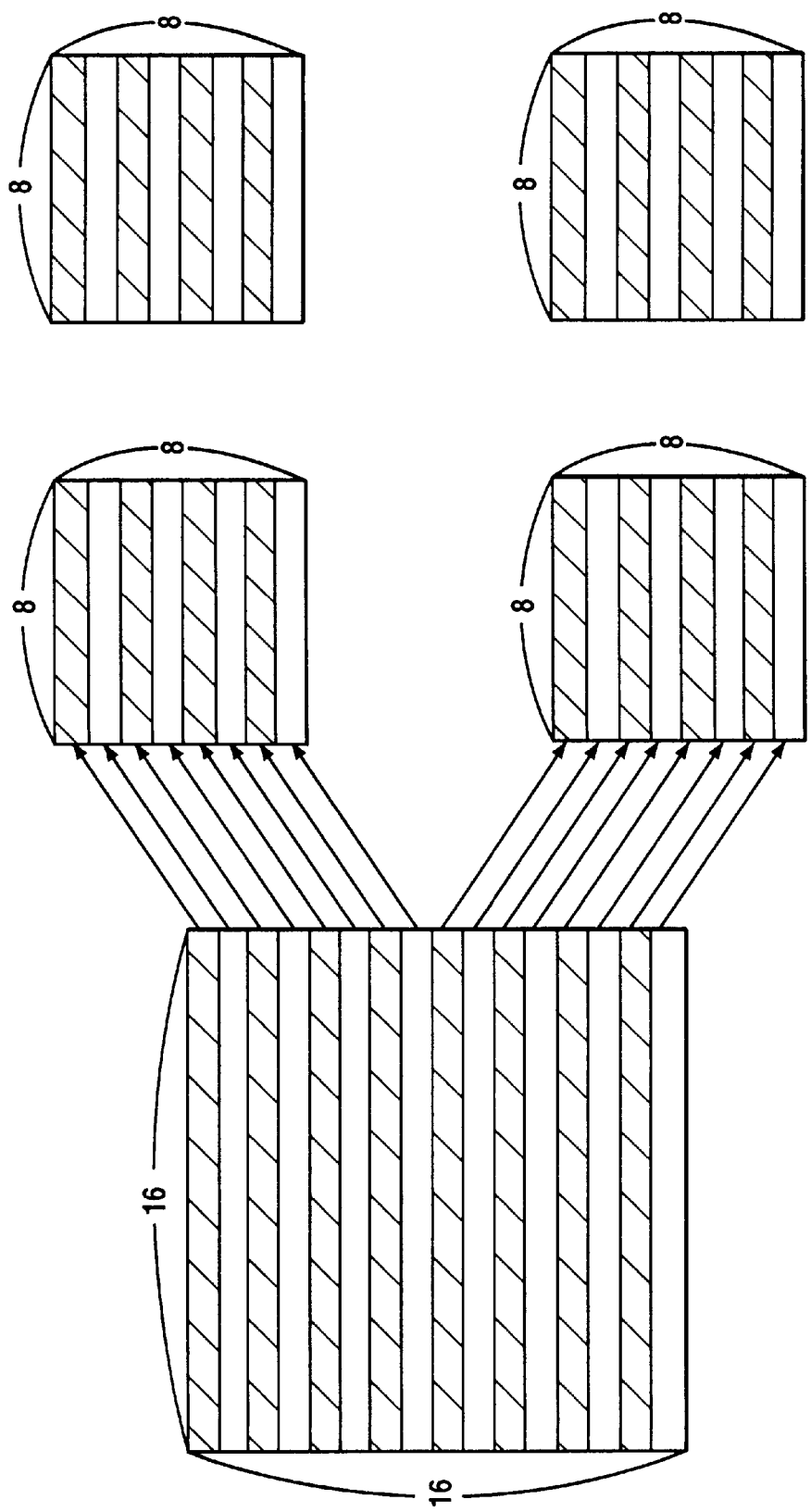
FIG. 3 is a descriptive view of splitting the macroblock to 4 blocks.

The block converter 116 converts the signal, as shown in FIG. 3, from a macroblock format of 16×16 pels to four blocks format of 8×8 pets to output to a DCT 118. The block converter 116 provides these pixel values one block at a time to the DCT 118.

Figure 4:
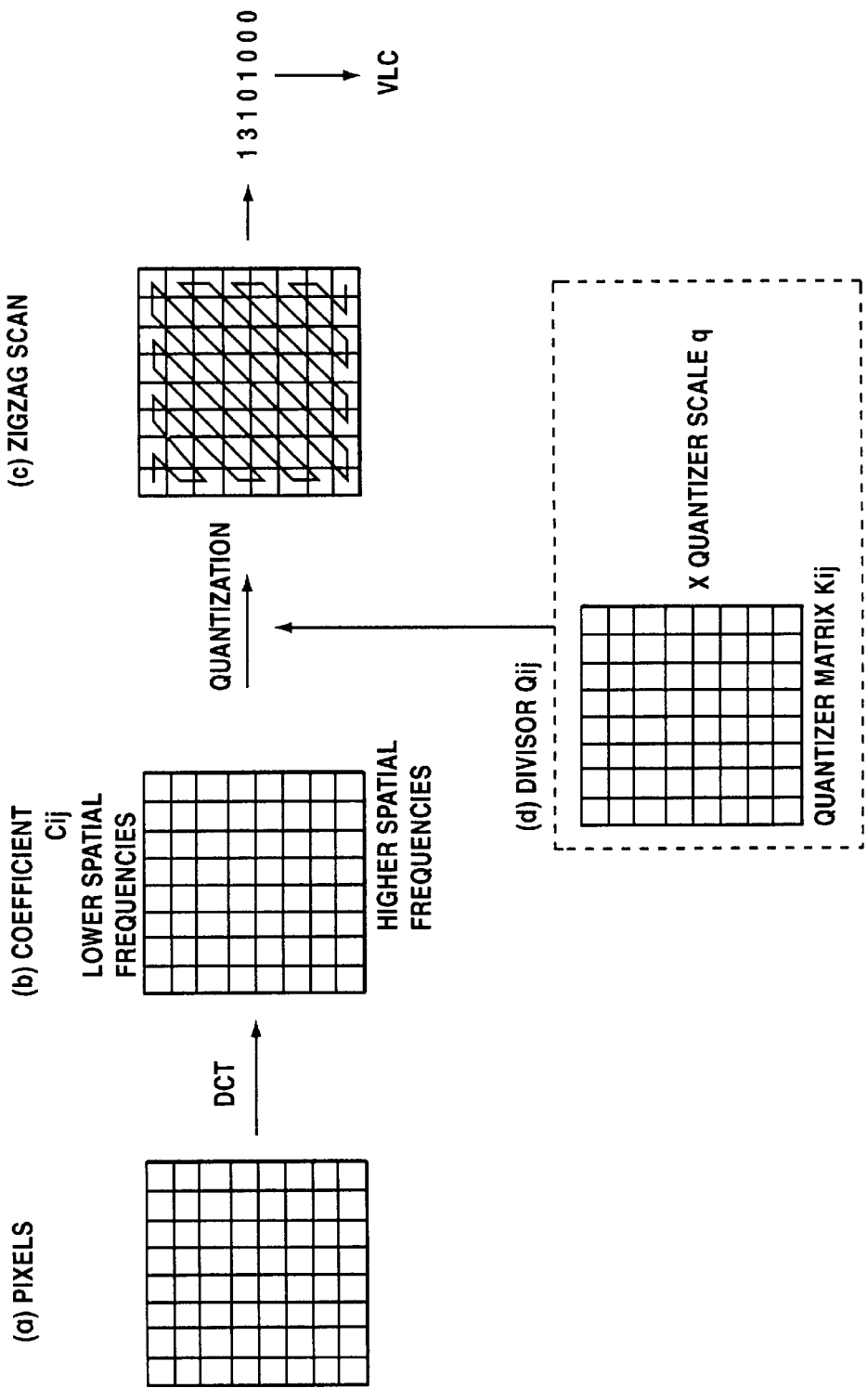
FIG. 4 is a descriptive view illustrating DCT and quantization.

The DCT processor 118 applies a DCT (discrete cosine transformation) to each ofthe blocks of pixel values to convert them into corresponding blocks of DCT coefficients Cij. Each of the blocks is then rearranged into a linear stream of 64 coefficients Cij using a zigzag scan such as that shown in FIG. 4(c). For any block, the first of these coefficients Cij represents the direct current (DC) spatial-frequency component of the pixels in the block and the remaining coefficients Cij at successively higher spatial frequencies.

The coefficient values provided by the DCT processor 118 are applied to a quantizer 120 which translates each coefficient value Cij into a binary value having an assigned number of bits. In general, a larger number of bits is used for the lower-order coefficients than for the higher-order coefficients since the human eye is less sensitive to image components at higher spatial frequencies than to image components at lower spatial frequencies. This operation may be performed, for example, by dividing each coefficient value in the linearized block by a respectively different value, which is proportional to the spatial frequency of the coefficient.

In addition, the number of bits assigned to each coefficient value may be changed in response to the quantizer scale q provided by quantizer control 132. The quantizer scale q may be applied to divide each coefficient value in the block by the quantizer scale q before or after they are divided by the quantizing matrix Kij. The quantizer 120 produces a stream of digital values which is applied to a variable-length coder (VLC) 124 and to an inverse quantizer 136.

The quantizer scale q controlling the compression rate is variable.

The variable-length coder (VLC) 124 encodes the data from the quantizer 120 using, for example, an amplitude run-length Huffman-type code. Using the Huffman-type code, the variable-length coder 124 assigns fewer bits to frequently occurring combinations of data values and run lengths of zeros.

There are a second VLC 134 which variable-length code the macroblock type (MBT) data and the motion vector data both from the mode selector 150.

The code generated by the VLC 124 and the VLC 134 are input to the FIFO memory 126. This FIFO memory 126 combines them to output a bitstream to the buffer memory (FIFO memory) 128. The bitstream stored in the buffer memory 128 is then recorded onto the recording medium 130 such as the optical disc.

In the MPEG encoder, the amount of the data stored in the buffer memory 128 is monitored and the amount of the data to be stored in a buffer memory on a MPEG decoder is simulated, and thereby the quantizer scale q is controlled so that the buffer memory of the MPEG decoder may not overflow. That is, the quantizer scale q is determined also in reference to the capacity of the buffer memory 128 and the variation in the capacity of the buffer memory 128. As the quantizer scale q, normally a value within a range from 1 to 31 is adopted.

In the B-picture and the P-picture, as the difference value is subjected to DCT and then output, an amount of the data is less than that of the I-picture. For this reason, in the MPEG type, a target amount of the data is allocated according to the picture type, and the amount of the generated data is monitored for each slice and macroblock. The amount of the data is compared with the target value and evaluated by the quantizer control 132. For example, when the amount of the generated data is greater than the target value, the quantizer scale q is enlarged and the quantization is coarsely performed. This control is performed by the quantizer control 132. On the other hand, when the amount of the generated data is less than the target value, the quantizer scale q becomes smaller and the quantization is finely performed. The buffer memory 128 buffers the variation in the amount of the generated data caused by the frame type, the frame characteristics and the quantizer scale.

Incidentally, it is not so general but the MPEG standard permits the variable transfer bit-rate in addition to the fixed transfer bit-rate. When the transfer bit-rate varies, it is quite natural that the quantizer scale q also varies.

A local decoder formed by an inverse quantizer 136 and an inverse DCT circuit 138 reproduces a reference image data for a preceding frame and/or for a following frame. The reproduced frame is stored in a frame memory 142 and then output to the subtractor 114, as described above. An adder 140 adds a motion compensated reference macroblock data in the reference frame to the data reproduced by the inverse quantizer 136 and the inverse DCT circuit 138 when the reproduced data is differential data.

A frame memory 142 stores the image data for at least two frames which are a pair of an I-picture and an I-picture, an I-picture and a P-picture, or a P-picture and a P-picture. The frame memory 142 outputs the image data for reference for each macroblock, while the frame memory 142 outputs the image data for motion vector detection to a motion vector detector 146 and for mode decision to a mode selector 150. In the motion detector 146, the region (reference macroblock) which bears the closest resemblance to the current macroblock within the current frame is selected within the reference frame by using, for example, the predictive error such as the mean square error of the difference between the motion compensated macroblock and the current macroblock or the mean absolute difference between them, as described previously. For example, the region having the minimum predictive error is selected as the reference macroblock. This technique is well-known, as disclosed in the aforementioned Japanese Unexamined Patent Publications, therefore, more detailed description here is omitted. The motion vector detector 146 composed of forward motion detector 146F, forward and backward motion vector detector 146M, and backward motion vector detector 146B. The motion vector detector 146 detects a motion vector according to a coding mode. The forward motion detector 146F detects a forward motion vector and outputs the detected vector and its predictive error to the motion compensation mode selecter 148. The forward and backward motion detector 146M detects a forward and backward motion vector and outputs the detected vector and its predictive error to the motion compensation mode selecter 148. The backward motion detector 146B detects a backward motion vector and outputs the detected vector and its predictive error to the motion compensation mode selecter 148.

The motion compensation mode selecter 148 selects the motion compensation mode having the smallest predictive error among the above three predictive errors from the motion vector detector 146. The motion compensation mode selecter 148 outputs the selected motion vector and its macroblock type (MBT) data to the mode selector 150 and the motion compensator 144. For example, the predictive error of the forward motion vector is the smallest, the forward motion vector and its macroblock type data is output to the above processors 150 and 144.

The motion compensator 144 directs the frame memory 142 to output image data describing a region (a reference macroblock) indicated by the motion vector data. As a result, the image data of the reference macroblock is sent to the subtractor 114 and, as described above, the difference between the current macroblock and the reference macroblock is obtained, and the differential data is sent to a DCT circuit 118. On the other hand, the image data of the reference macroblock is sent to the adder 140, and as described above, is added to the differential data of the current macroblock decoded through the inverse quantizer 136 and the inverse DCT 138. Here, the processing in the motion compensator 144 is performed in reference to the MBT data sent from a mode selector 148. That is, determination of whether the preceding frame should be output from the frame memory 142, the following frame should be output therefrom, or both the preceding frame and the following frame should be output or should not be output therefrom is made according to the MBT data.

The mode selector 150 selects either the intra coding or the inter coding. In other words, the mode selector 150 detects the correlativity based on the difference between the current frame and the two frames within the frame memory 142, and outputs the MBT data which is the highest in compression rate. Specifically, the variance value of the current macroblock, the variance value of the difference between the current macroblock and the following frame macroblock, the variance value of the difference between the current macroblock and the preceding frame macroblock, and the variance value of the difference between the current macroblock and the preceding and following frame macroblocks are operated, and the type with the smallest variance value is determined as the macroblock type to be applied to the current macroblock.

(2)First Embodiment (FIG. 5 to FIG. 8)

The encoder of the first embodiment is close to the above exemplary MPEG encoder. Therefore, the same part as in the above encoder is designated by the same symbol, and its description is omitted.

The encoder of the first embodiment has buffer memories 50, 52, 54, 56, mode selecter 58, and mode selector 60. The bitstream having the intra coding applied and then output from the encoder is stored into the buffer memory 50. The bitstream having the forward motion-compensated inter-picture coding applied and then output from the encoder is stored into the buffer memory 52. The bitstream having the forward and backward motion-compensated inter-picture coding applied and then output from the encoder is stored into the buffer memory 54. The bitstream having the backward motion-compensated inter-picture coding applied and then output from the encoder is stored into the buffer memory 56.

The mode selecter 58 detects the amounts of code stored in the buffer memories 50, 52, 54, 56, respectively, and determines the minimum amount of code. This minimum value and the coding mode corresponding to the determined minimum amount are sent to the mode selector 60. In other words, the mode selecter 5 8 functions as a part of determining means for determining a total amount of code for each coding mode, respectively.

The mode selector 60 selects the coding mode to be applied to the current video data such as the current macroblock with reference to the data input from the mode selector 58. In other words, the mode selector 60 functions as a part of the selecting means for selecting a coding mode to be used to encode the current video data.

As aforementioned, when a B-picture is encoded, the coding mode for each macroblock must be specified. The motion vector detector 146 detects a motion vector for each coding mode, respectively.

Figure 6:
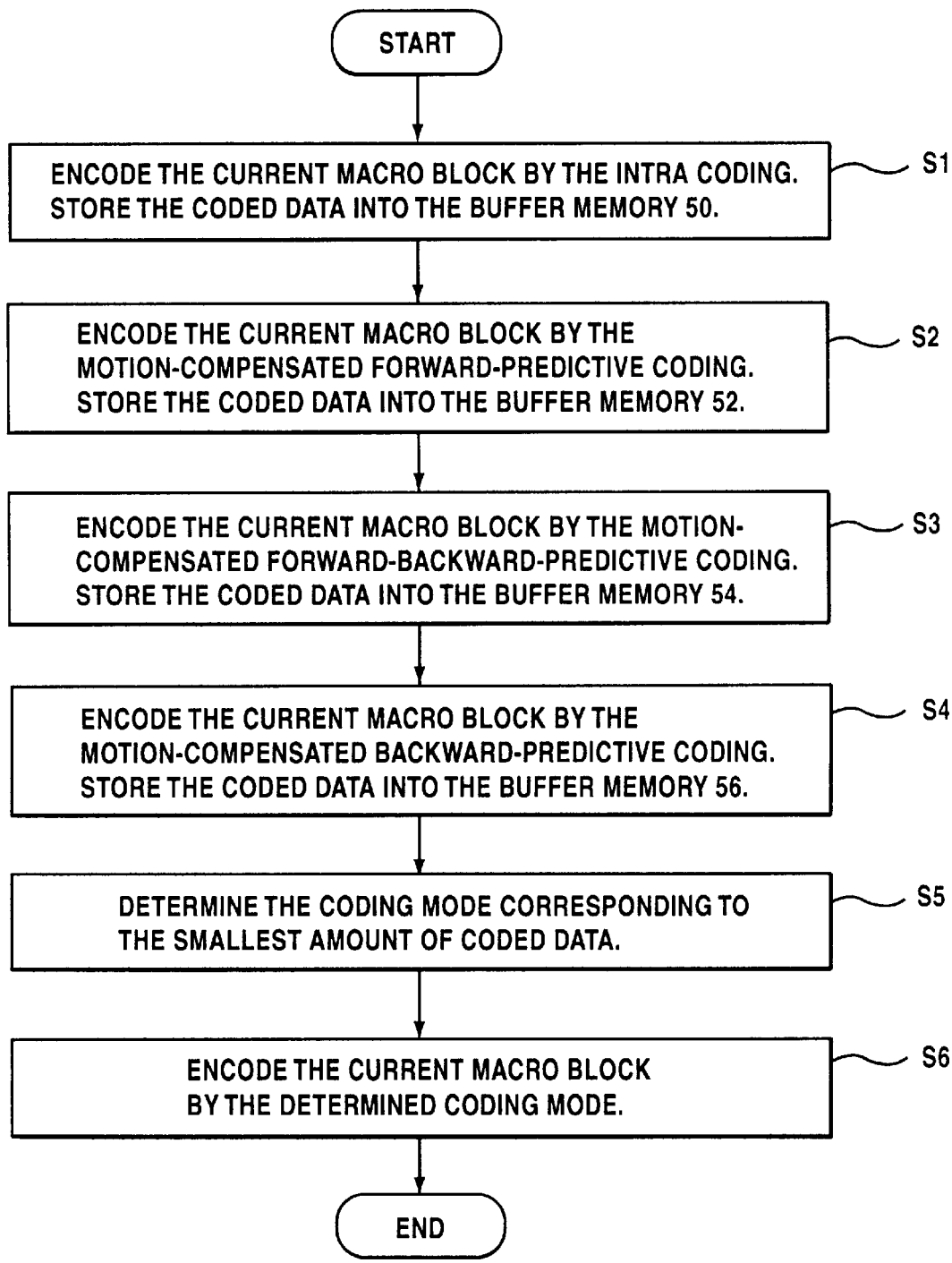
FIG. 6 is a flowchart describing an example procedure executed in the first embodiment.

As shown step S1 in FIG. 6, the current macroblock is encoded by using the intra coding technique according to the instructions from the mode selector 60 and the resultant bitstream is stored into the buffer memory 50. Next, the current macroblock is encoded by using the motion-compensated and forward-predictive inter coding technique according to the instructions from the mode selector 60 and the resultant bitstream is stored into the buffer memory 52, as shown step S2 in FIG. 6. Next, the current macroblock is encoded by using the motion-compensated and forward-and-backward-predictive inter coding technique according to the instructions from the mode selector 60 and the resultant bitstream is stored into the buffer memory 54, as shown step S3 in FIG. 6. Next, the current macroblock is encoded by using the motion-compensated and backward-predictive inter coding technique according to the instructions from the mode selector 60 and the resultant bitstream is stored into the buffer memory 56, as shown step S4 in FIG. 6. Next, as shown in step S5 in FIG. 6, the mode selecter 58 detects the amounts of code stored in the buffer memories 50, 52, 54, 56, respectively, and determines the minimum amount of code to output to the mode selector 60. Then, as shown step S6 in FIG. 6, the mode selector 60 selects the coding mode to be applied to the current video data with reference to the data input from the mode selecter 58. After the step S6, normal operations for video encoding are executed.

In the above operation for selecting the coding mode, when an amount of data being stored in the buffer memory 50 is the smallest, mode selector 60 outputs macroblock type data MBT of the intra coding mode to the motion compensator 144 and to the VLC 134. When an amount of data being stored in the buffer memory 52 is the smallest, mode selector 60 outputs macroblock type data MBT of the motion-compensated and forward-predictive inter coding mode and the corresponding motion vector to the motion compensator 144 and to the VLC 134. When an amount of data being stored in the buffer memory 54 is the smallest, mode selector 60 outputs macroblock type data MBT of the motion-compensated and forward-and-backward predictive inter coding mode and the corresponding motion vectors to the motion compensator 144 and to the VLC 134. When an amount of data being stored in the buffer memory 56 is the smallest, mode selector 60 outputs macroblock type data MBT of the motion-compensated and backward-predictive inter coding mode and the corresponding motion vector to the motion compensator 144 and to the VLC 134.

As stated above, in the encoder of the first embodiment, the coding mode corresponding to the smallest amount of total code is selected from among available coding modes, and the selected coding mode is applied to encode the current macroblock.

Figure 5:
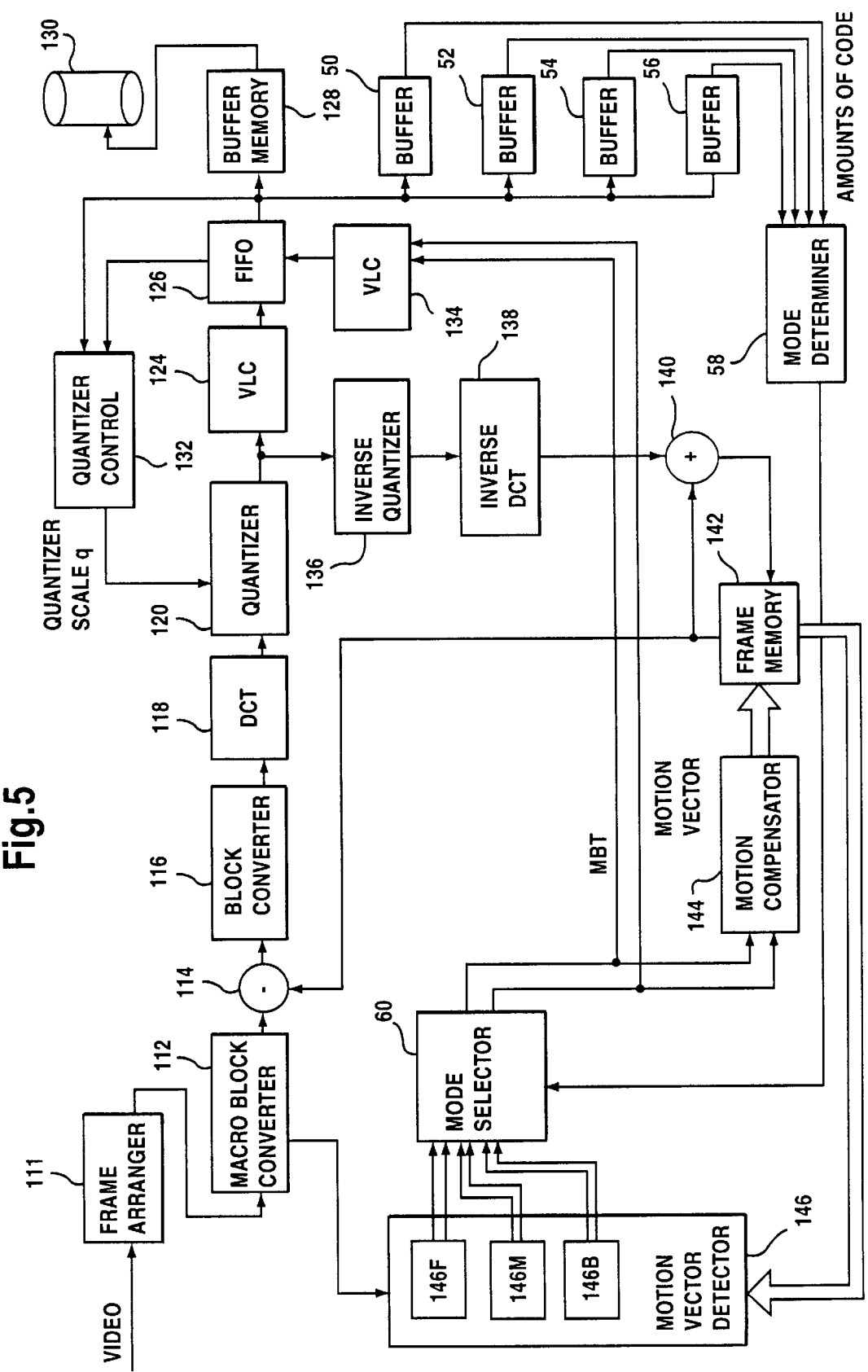
FIG. 5 is a block diagram of the first embodiment.

In FIG. 5, the encoder of the first embodiment is illustrated that is composed of hardware circuitry, however, the encoder of this embodiment may include software parts.

In the above described encoder, the amount of total code corresponding to the intra coding mode is determined by the mode determiner 58, however, this determination for the intra coding mode may be omitted to simplify that part of the encoder.

In the first embodiment, three types of motion compensation mode is described, however, the mode determiner 58 may select either frame-prediction or field-prediction, where both are defined by the frame construction of the MPEG2 standard. Also, the mode determiner 58 may select either 16×16-pixels-prediction or 16×8-pixels-prediction, where both are defined by the field construction of the MPEG2 standard.

In the above description, the B-picture is taken as an example, and the P-picture can be encoded in a like manner.

In the first embodiment, the amount of total code for each coding mode is always determined by the mode determiner 58, however, the determination may be performed when the buffer memory 128 is heading toward overflow, or when the quantizer scale q is set to a larger value. Thereby an amount of total code input to the buffer memory 128 is reduced.

In the first embodiment, the amount of total code for each coding mode is determined respectively by encoding the current macroblock really using each coding mode. However, the amount of total code for two types of coding modes having smaller predictive error than others may be determined by actually encoding the current macroblock. This construction may suppress total operation in program, or may raise the speed of the operation.

Figure 7:
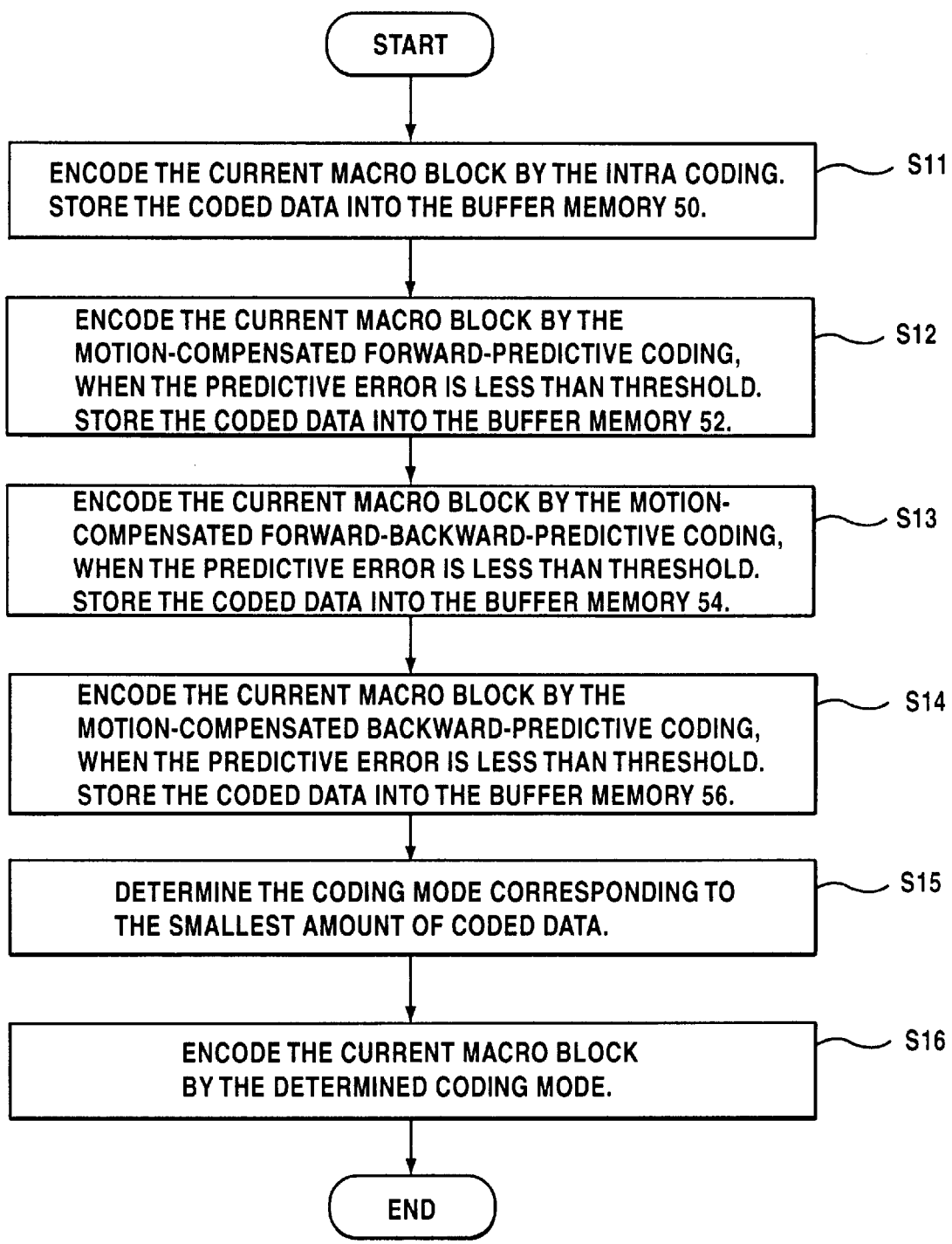
FIG. 7 is a flowchart describing an example procedure executed in the first embodiment.

Also, the amount of total code for the coding mode having a smaller predictive error than predetermined threshold may be determined by actually encoding the current macroblock, as shown in steps S12 to S14 in FIG. 7. This construction may also suppress total operation in program, or may also raise the speed of the operation.

Figure 8:
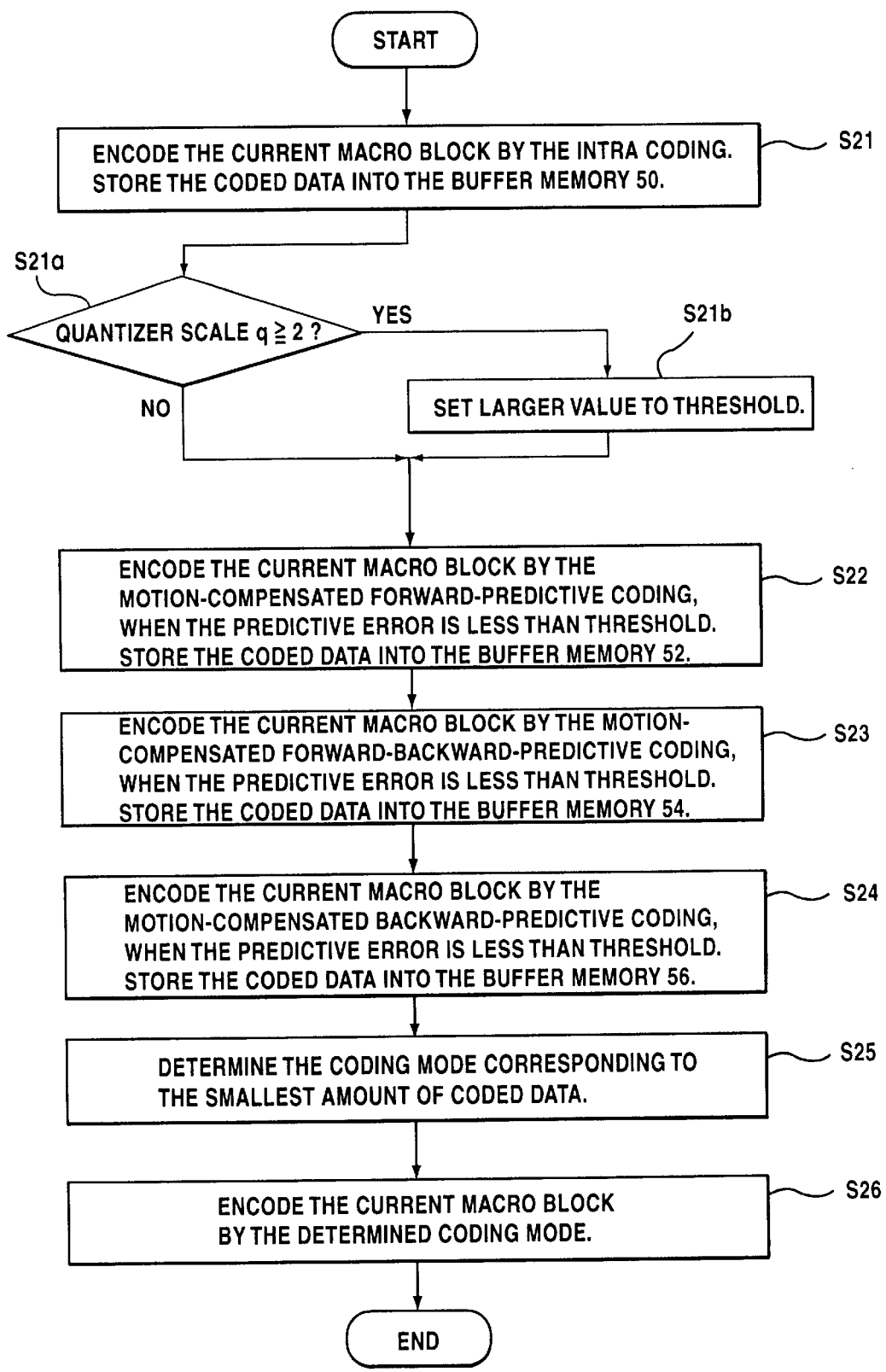
FIG. 8 is a flowchart describing an example procedure executed in the first embodiment.

As an additional plus, the above mentioned threshold may be varied according to the quantizer scale q or other parameters such as compression rate, as shown step S21*a* and S21*b* in FIG. 8. This construction may suppress an amount of total code input to the buffer memory 128.

Figure 9:
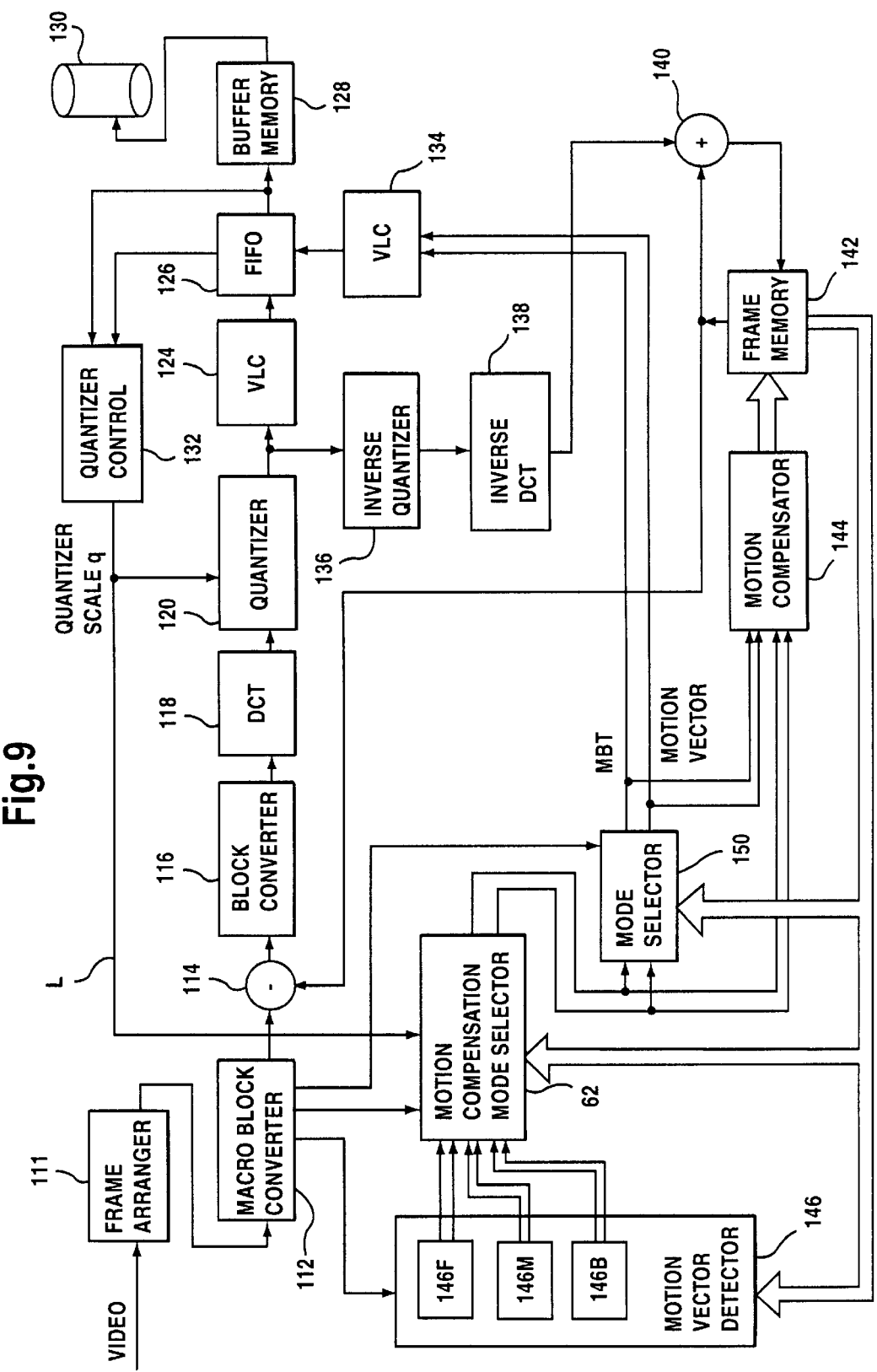
FIG. 9 is a block diagram of the second embodiment.

(3)Second Embodiment (FIG. 9)

The encoder of the second embodiment is close to the aforementioned exemplary MPEG encoder. Therefore, the same part as in the exemplary MPEG encoder is designated by the same symbol, and its description is omitted.

In the encoder of the second embodiment, the criterion for the above determination or the above selection is varied according to the compression rate, the quantizer scale q, the amount of total code input to the buffer memory 128, or the like.

The encoder varying the criterion for the determination according to the quantizer scale q, and estimating the amount of total code for each coding mode by calculating the variance of the difference macroblock, respectively, will be described.

The encoder of the second embodiment has the motion compensation mode selector 62 and the line L.

The motion compensation mode selector 62 determines the coding mode corresponding to the predictive error which is less than a given threshold. This threshold is varied according to the quantizer scale q. For example, when the quantizer scale q is set to be a large value, the threshold is changed to large value. Here, the quantizer scale q is given from the quantizer control 132 to the motion compensation mode selector 62 through the line L.

The motion compensation mode selector 62 compares each of the predictive errors with the threshold, respectively, and determines the coding mode whose predictive error is smaller than the threshold. When the coding mode satisfying the above condition is not determined, the coding mode whose predictive error is the smallest is determined. Then, the macroblock type data MBT and the motion vector, both of which are corresponding to the determined coding mode, are output to the mode selector 150 and to the motion compensator 144.

When one coding mode satisfying the above condition is determined, the macroblock type data MBT and the motion vector, both of which are corresponding to the one coding mode, are output to the mode selector 150 and to the motion compensator 144.

When two or more coding modes satisfying the above condition are determined, the variance of the difference macroblock, which is the difference between the current macroblock and the reference macroblock defined by macroblock type data MBT and a motion vector, is calculated for each of the above two or more coding modes, respectively.

Firstly, the motion compensation mode selector 62 outputs the macroblock type data MBT and the motion vector, both of which are corresponding to one of the above two or more coding modes, to the motion compensator 144. Thereby, the reference macroblock data defined by the above macroblock type data MBT and the above motion vector is output from the frame memory 142 to the compensation mode selector 62 according to the instructions given by the motion compensator 144.

The motion compensation mode selector 62 calculates the difference data between the current macroblock data from the macroblock converter 112 and the reference macroblock data from the frame memory 142, and then calculates the variance of the obtained difference macroblock data.

These operations are executed for all of the above two or more coding modes. The motion compensation mode selector 62 compares these variances with each other, and determines the suitable motion compensation mode. In other words, the motion compensation mode selector 62 functions as a selecting means for selecting the coding mode with reference to the output of the motion vector detector 146 and the compression rate such as the quantizer scale q. Also, the motion compensation mode selector 62 functions as a setting means for setting the criterion for the above selection according to the compression rate.

Incidentally, in this second embodiment, the above mentioned variance is calculated again in the mode selector 150, however, this mode selector 150 may be integrated into the motion compensation mode selector 62.

Figure 17:
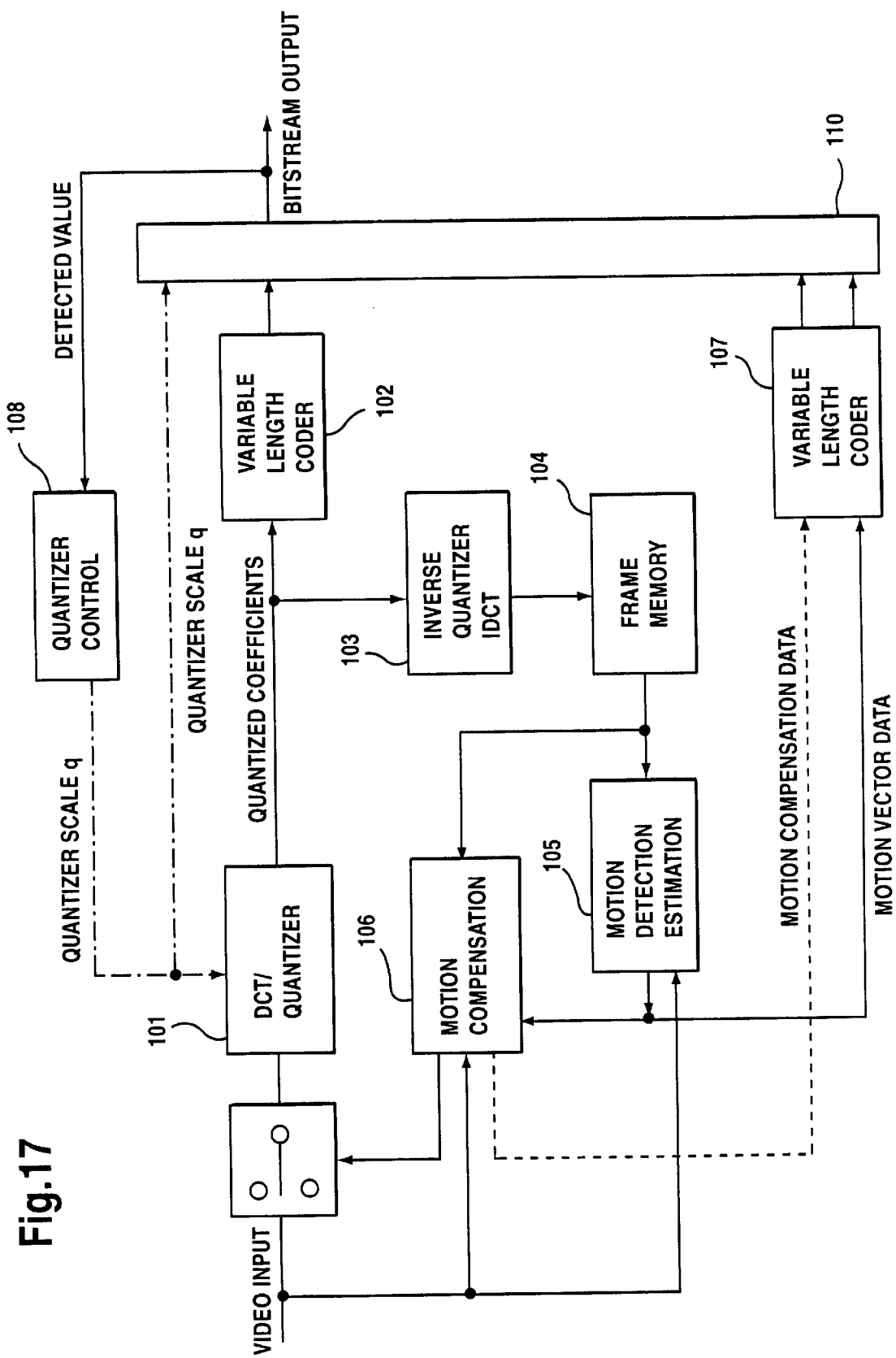
FIG. 17 is a block diagram of an exemplary video encoder.
Figure 18:
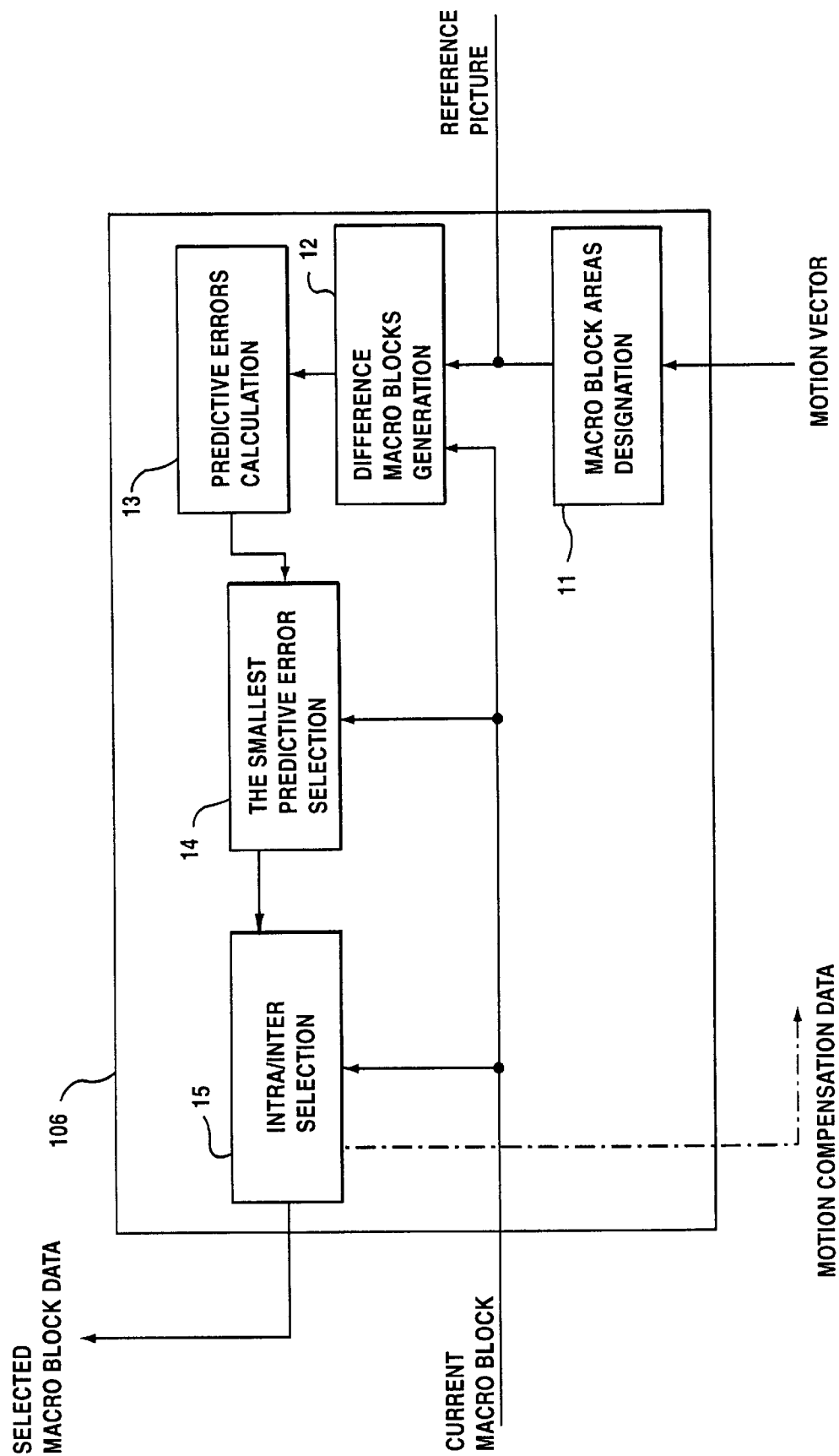
FIG. 18 shows the details of the FIG. 17.

(4)Motion-Compensated Predictive Coding (FIG. 17, FIG. 18)

An exemplary technique for encoding the video data by using the motion-compensated predictive coding will be described. This exemplary technique is composed of, for example, the DCT, the adaptive quantization, the variable length coding, the motion compensation, the forward prediction, the backward prediction, and the forward and backward prediction. Also, the video data to be encoded by the above technique is comprised of the I-pictures, the P-pictures, and the B-pictures.

In FIG. 17, the intra-picture being applied to the processor 101 is compressed non-reversibly by using the DCT and the adaptive quantization techniques. The quantizer scale q for this adaptive quantization is set by the quantizer control 108. The quantized coefficient data from the processor 101 is applied to the VLC 102 and the processor 103. The VLC 102 encodes the input data by the variable length coding technique to output to the FIFO memory 110. In the FIFO memory 110, the coded data from the VLC 102 is combined with the quantizer scale q from the quantizer control 108 and this combined bitstream is output to a buffer memory (not shown).

The quantized coefficient data from the processor 101 is also applied to the processor 103 and is decoded by using the inverse quantization and the inverse DCT techniques. This decoded video data is stored into the frame memory 104.

In FIG. 17, the inter-macroblock being applied to the processor 105 is compared with the reference picture output from the frame memory 104, thereby, the motion vector is detected. When two or more motion compensation modes are available, the motion vector is detected for each of the two or more motion compensation modes, respectively. Next, in the motion compensation processor 106, either the motion compensation mode having the smallest inter-picture-predictive error or the coding mode without motion compensation is selected.

The difference macroblock data, which is generated according to the above selected mode, is input to the processor 101 and compressed non-reversibly by using the DCT and adaptive quantization techniques as in the case of the aforementioned intra-macroblock within the intra-picture. Then, the quantized coefficient data is sent to the VLC 102 and the variable length coding is applied. Incidentally, when the intra-mode is selected in the motion compensation processor 106, the intra-macroblock is applied to the processor 101.

The mode data and the motion vector data for the motion compensation mode, both of which are generated in the motion compensation processor 106, are sent to the VLC 107 and the variable length coding is applied. This coded data is sent to the FIFO memory 110 and combined with the compressed video data from the VLC 102 and the quantizer scale q from the quantizer control 108.

A bitstream, which is composed of the compressed video data, the quantizer scale q, the coded mode data, and the coded motion vector data, is read from the FIFO memory 110 and sent to the buffer memory (not shown). The amount of this bitstream is sent to the quantizer control 108, and the target value for a bitstream of remaining data is determined based on this amount.

FIG. 18 shows the detail of the motion compensation processor 106. In the macroblock areas designation 11, the position of the reference macroblock within the reference picture is designated by the detected motion vector, and the designated reference macroblock is extracted from the reference picture. This extracted reference macroblock is sent to the difference macroblocks generation 12. In the difference macroblocks generation 12, the difference between the current macroblock and the reference macroblock is calculated to generate the difference macroblock. These operations are executed for each inter-picture coding mode. Incidentally, when the inter-picture coding mode without motion compensation (without motion vector) is operated, the same position as the current macroblock is designated in the macroblock areas designation 11.

In the predictive error calculation 13, the predictive error of each difference is calculated by using the aforementioned well-known, respectively. These calculated predictive errors are sent to the processor 64.

In the smallest predictive error selection 14, the motion compensation mode, which is corresponding to the smallest predictive error, is selected among from the inter-picture coding mode.

Next, either the inter-picture coding mode, which is selected in the smallest predictive error selection 14, or the intra-coding mode is selected in the intra/inter selection 15. For example, when the above predictive error exceeds a predetermined threshold, intra-coding mode is selected.

When the inter-picture coding mode with the motion compensation is selected, the motion compensation mode data and the motion vector data, both of which are corresponding to the selected coding mode, are sent to the VLC 107, and the difference macroblock data is applied lo to the processor 101 (DCT and quantization processor 101), as shown in FIG. 17. When the inter-picture coding mode without the motion compensation is selected, the difference macroblock data is applied to the processor 101 (DCT and quantization processor 101), as shown in FIG. 17. When the intra-coding mode is selected, the current macroblock data is applied to the processor 101 (DCT and quantization processor 101), as shown in FIG. 17.

Figure 10:
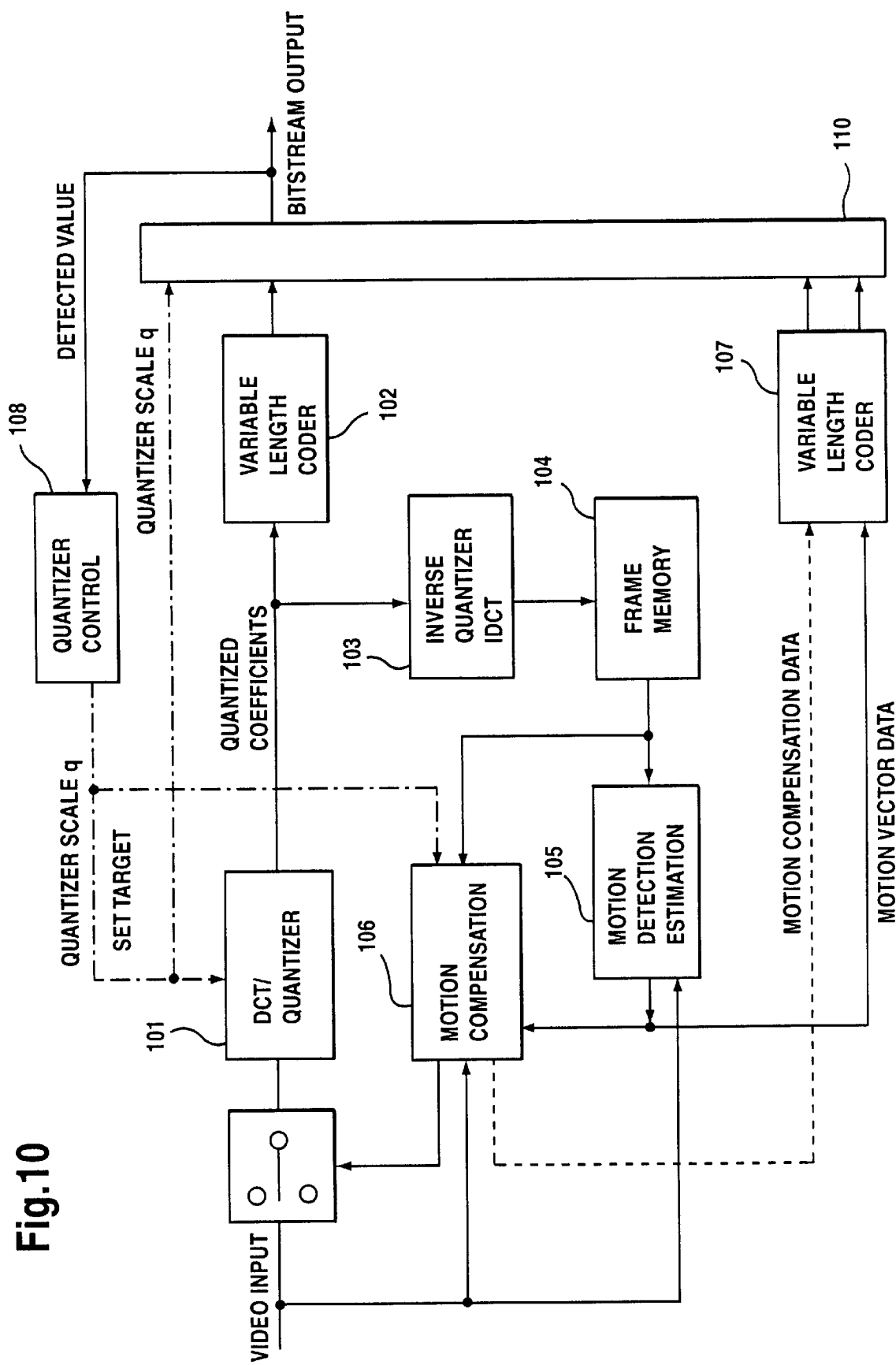
FIG. 10 is a block diagram of the third embodiment.
Figure 11:
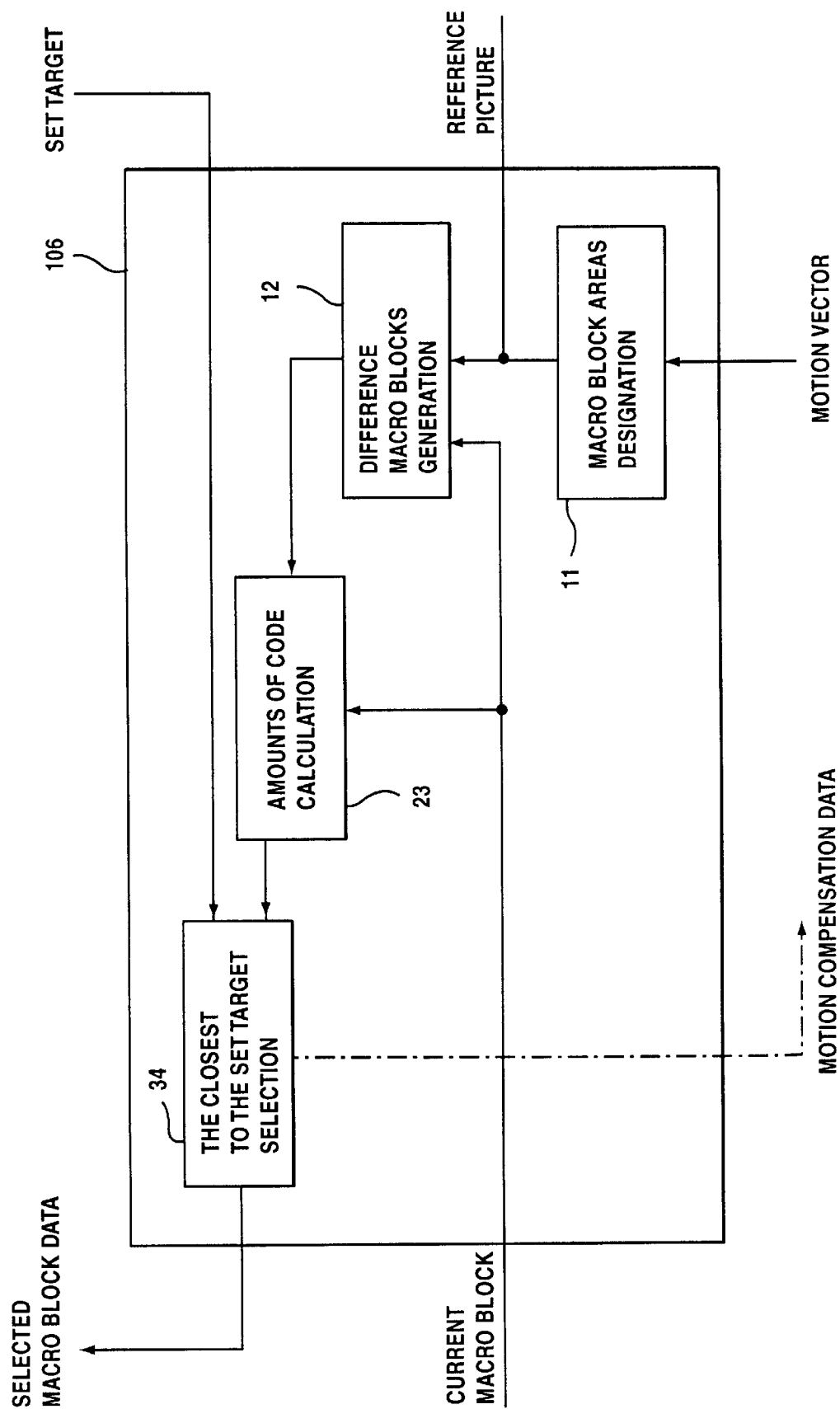
FIG. 11 shows an example of the details of the FIG. 10.

(5)Third Embodiment (FIG. 10, FIG. 11)

The third embodiment is similar to the aforementioned exemplary technique for encoding the video data. Therefore, the same part as in the exemplary technique is designated by the same symbol, and its description is omitted.

As shown in FIG. 10, the DCT and quantizer processor 101, the VLC processor 102, the inverse quantizer and inverse DCT processor 103, the frame memory 104 , the motion detection and estimation processor 105, the motion compensation processor 106, the VLC processor 107, the quantizer control processor 108, and the FIFO memory 110 are employed in the technique of the third embodiment. The frame memory 104 has a capacity for at least two frames. The motion compensation processor 106 of the third embodiment is different from that of the exemplary technique.

The compression technique for the intra picture is the same as the aforementioned exemplary technique, therefore, the compression technique for the inter picture will be described.

The current macroblock within the inter-picture such as the P-picture or the B-picture, which is applied to the processor 105, is compared with the reference picture output from the frame memory 104, thereby, the motion vector is detected. Next, in the motion compensation processor 106, a suitable motion compensation mode is selected referring to the target value which is obtained based on the amount of code already output from the FIFO memory 110 to a buffer memory (not shown).

As shown in FIG. 11, in the macroblock areas designation 11, the position of the reference macroblock within the reference picture is decided by the detected motion vector, and the resulting reference macroblock is input to the difference macroblocks generation 12 to generate the difference macroblock data. These operations are executed for each inter-picture coding mode.

In the amounts of code calculation 23, the amount of total code for each coding mode is calculated, respectively. Each of this total code is generated by applying the encoding techniques of this embodiment to the current macroblock using each of the coding modes, respectively. Each of the amount of the total code is calculated , for example, by actually executing the above encoding, or by comparing the difference macroblock with the reference data pre-stored in the reference table which has the amounts of the total code corresponding to each of the components of the difference macroblocks, each of the patterns of the difference macroblocks, and each of the motion vectors of the difference macroblocks. This reference table may be in the amounts of code calculation 23. Incidentally, when the above encoding for the calculation ofthe amounts ofthe total code is actually executed, the DCT and quantizer processor 101, the VLC 102, and so on may be used. The calculated amounts of total code is output to the processor 34.

In the processor 34 (the closest to the set target selection 34), the motion compensation mode, which is corresponding to the amount of the total code that is the closest to the target value, is selected. Then, the selection for either the intra-coding mode or the intercoding mode is executed (not shown), same as the exemplary technique.

When the inter-picture coding mode with the motion compensation is selected, the motion compensation mode data and the motion vector data, both of which are corresponding to the selected coding mode, are sent to the VLC 107, and the difference macroblock data is applied to the processor 101 (DCT and quantization processor 101). When the inter-picture coding mode without the motion compensation is selected, the difference macroblock data is applied to the processor 101. Here, when the amount of the total code has been calculated by really executing the above encoding, the total code corresponding to the selected mode being stored in the FIFO memory 110 may be output to the buffer memory (not shown) instead of applying the selected difference macroblock data to the processor 101.

Figure 12:
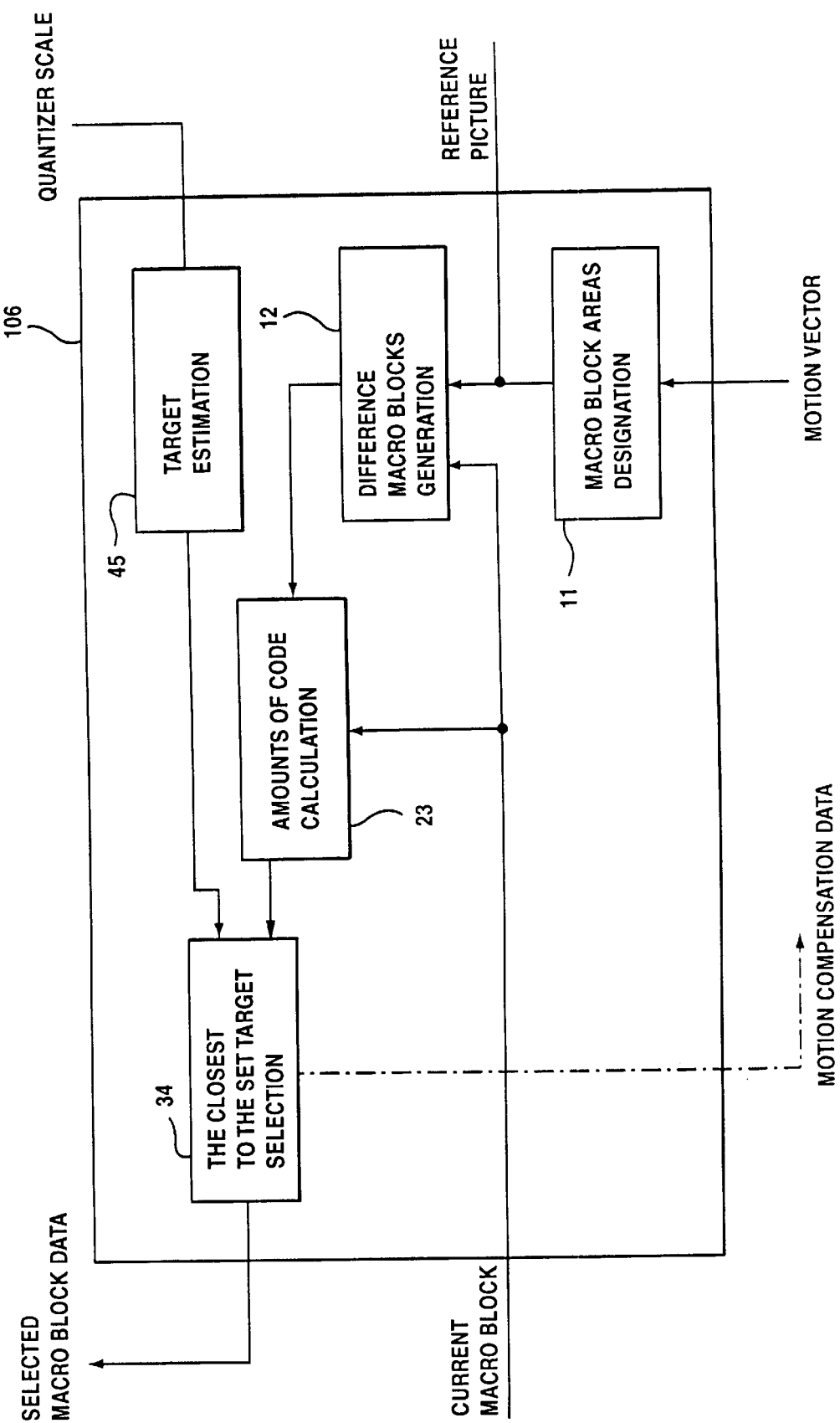
FIG. 12 shows an example of the details of the FIG. 10.

(6)Fourth Embodiment (FIG. 12)

The fourth embodiment is close to the third embodiment. Therefore, the same part as in the third embodiment is designated by the same symbol, and its description is omitted.

In the fourth embodiment, the target amount of the total code is estimated based on the quantizer scale q, and the motion compensation mode, which corresponds to the amount of the total code that is the closest to the estimated target value, is selected.

As shown in FIG. 12, in the macroblock areas designation 11, the position of the reference macroblock within the reference picture is decided by the detected motion vector, and the resulting reference macroblock is input to the difference macroblocks generation 12 to generate the difference macroblock data. These operations are executed for each inter-picture coding mode.

In the amounts of code calculation 23, the amount of total code for each coding mode is calculated respectively. Each of these total codes is generated in the same manner as in the third embodiment, and each of these amounts of the total code is calculated in the same manner as in the third embodiment.

In the target estimation 45, the target value for the amount of the total code is estimated based on the quantizer scale q given by the quantizer control 108. For example, the target value is estimated by comparing the given quantizer scale q with the remaining capacities, which are pre-stored in the table, of the buffer memory (not shown). This table may be set in the target estimation 45. The above estimated target value is output to the processor 34.

In the processor 34 (the closest to the set target selection 34), the motion compensation mode, which corresponds to the amount of the total code that is the closest to the estimated target value, is selected. Then, the selection for either the intra-coding mode or the inter-coding mode is executed (not shown), in the same manner as in the third embodiment.

When the inter-picture coding mode with the motion compensation is selected, the motion compensation mode data and the motion vector data, both of which corresponds to the selected coding mode, are sent to the VLC 107, and the difference macroblock data is applied to the processor 101 (DCT and quantization processor 101). When the inter-picture coding mode without the motion compensation is selected, the difference macroblock data is applied to the processor 101. Here, when the amount of the total code has been calculated by really executing the above encoding, the total code corresponding to the selected mode being stored in the FIFO memory 110 may be output to the buffer memory (not shown) instead of applying the selected difference macroblock data to the processor 101.

Figure 13:
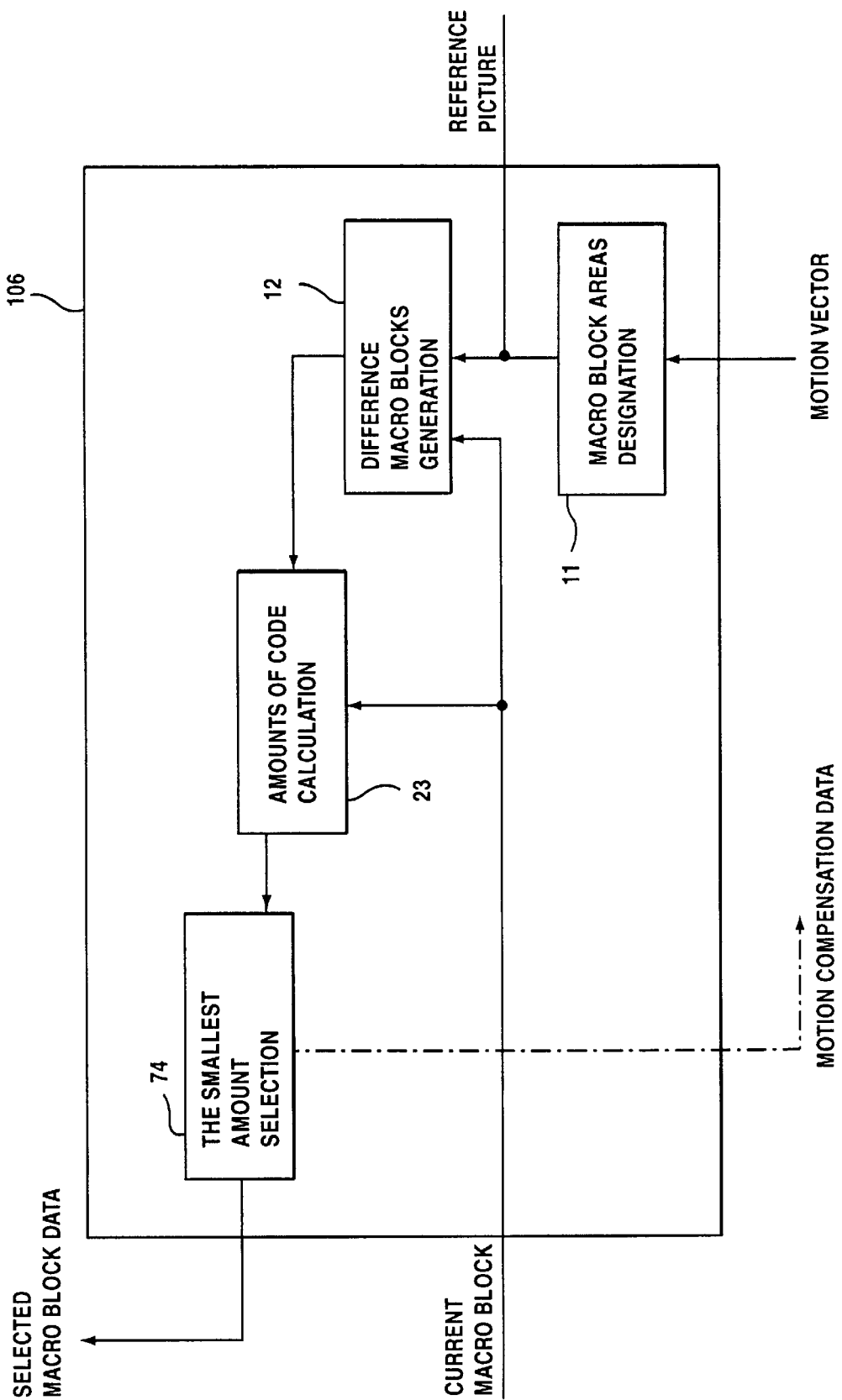
FIG. 13 shows an example of the details of the FIG. 10.

(7)Fifth Embodiment (FIG. 13)

The fifth embodiment is close to the third embodiment. Therefore, the same part as in the third embodiment is designated by the same symbol, and its description is omitted.

In the fifth embodiment, the motion compensation mode corresponding to the smallest amount of the total code is selected.

As shown in FIG. 13, in the macroblock areas designation 11, the position of the reference macroblock within the reference picture is decided by the detected motion vector, and the resulting reference macroblock is input to the difference macroblocks generation 12 to generate the difference macroblock data. These operations are executed for each inter-picture coding mode.

In the amounts of code calculation 23, the amount of total code for each coding mode is calculated, respectively. Each of these total codes is generated same as the third embodiment, and each of these amounts of the total code is calculated same as the third embodiment. These calculated amounts of total code are sent to the processor 74.

In the processor 74 (the smallest amount selection 74), the motion compensation mode, which corresponds to the smallest amount of the total code, is selected. Then, the selection for either the intra-coding mode or the inter-coding mode is executed (not shown), the same as in the third embodiment.

When the inter-picture coding mode with the motion compensation is selected, the motion compensation mode data and the motion vector data, both of which corresponds to the selected coding mode, are sent to the VLC 107, and the difference macroblock data is applied to the processor 101 (DCT and quantization processor 101). When the inter-picture coding mode without the motion compensation is selected, the difference macroblock data is applied to the processor 101. Here, when the amount of the total code has been calculated by actually executing the above encoding, the total code corresponding to the selected mode being stored in the FIFO memory 110 may be output to the buffer memory (not shown) instead of applying the selected difference macroblock data to the processor 101.

Figure 14:
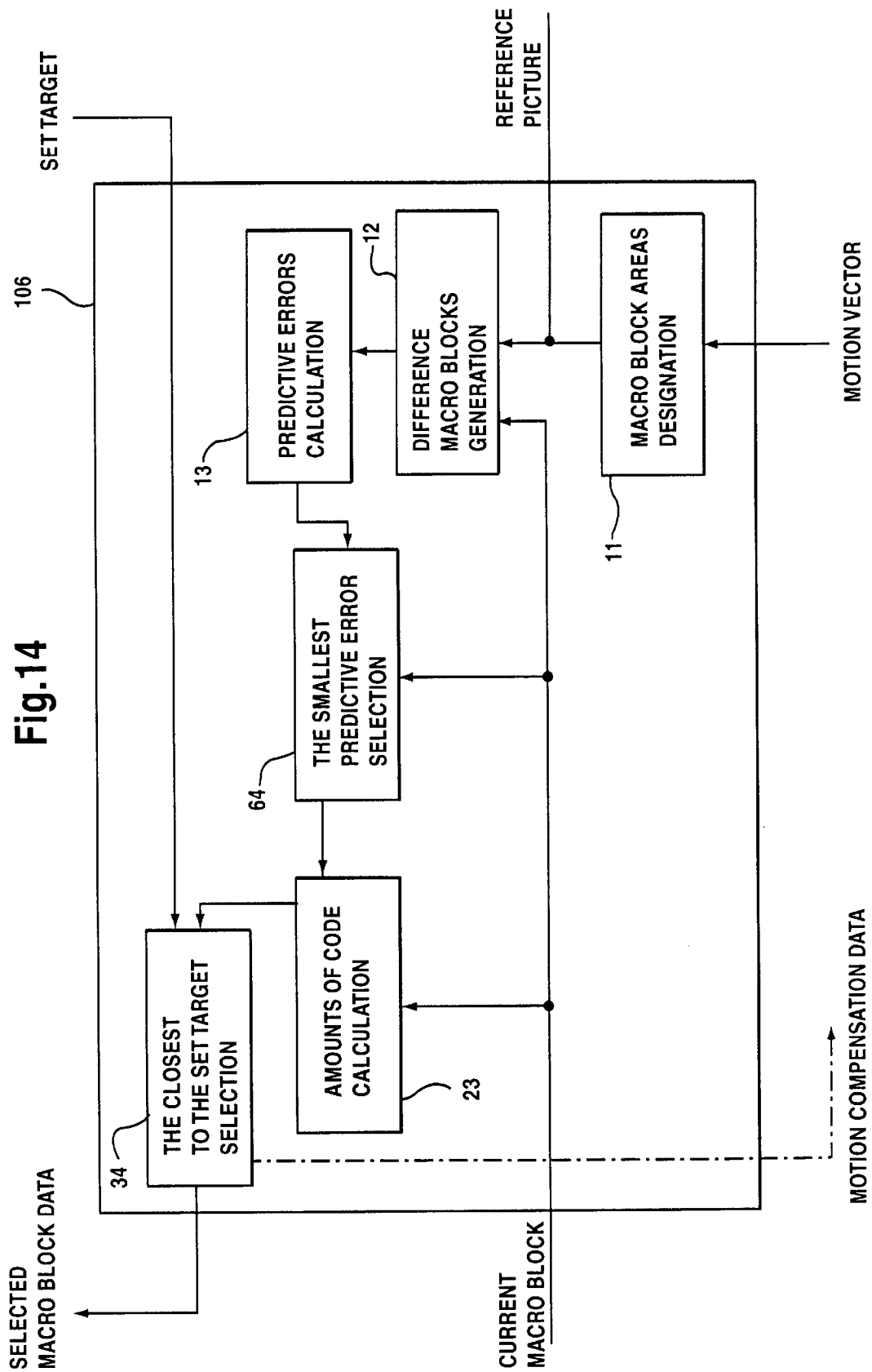
FIG. 14 shows an example of the details of the FIG. 10.

(8)Sixth Embodiment (FIG. 14)

The sixth embodiment is similar to the third embodiment. Therefore, the same parts as in the third embodiment are designated by the same symbols, and their descriptions are omitted.

In the sixth embodiment, the amount of total code is calculated about the motion compensation mode whose predictive error is the smallest.

As shown in FIG. 14, in the macroblock areas designation 11, the position of the reference macroblock within the reference picture is decided by the detected motion vector, and the resulting reference macroblock is input to the difference macroblocks generation 12 to generate the difference macroblock data. These operations are executed for each inter-picture coding mode.

In the predictive error calculation 13, the predictive error of the each difference macroblock is calculated by using the aforementioned well-known technique, respectively. These calculated predictive errors are sent to the processor 64.

In the processor 64 (the smallest predictive error selection 64), the smallest predictive error is selected. The coding mode data corresponding to the selected predictive error is sent to the processor 23.

In the processor 23 (amounts of code calculation 23), the amounts of total code for the above selected coding mode and for the intra-coding mode are calculated respectively. Each of these total codes is generated same as the third embodiment, and each of these amounts of total code is calculated the same as in the third embodiment. These calculated amounts of total code are sent to the processor 34.

In the processor 34 (the closest to the set target selection 34), the motion compensation mode, which is corresponding to the amount of the total code that is the closest to the target value given by the quantizer control 108, is selected. Then, the selection for either the intra-coding mode or the inter-coding mode is executed (not shown), the same as in the third embodiment.

When the inter-picture coding mode with the motion compensation is selected, the motion compensation mode data and the motion vector data, both of which are corresponding to the selected coding mode, are sent to the VLC 107, and the difference macroblock data is applied to the processor 101 (DCT and quantization processor 101). When the inter-picture coding mode without the motion compensation is selected, the difference macroblock data is applied to the processor 101. Here, when the amount of the total code has been calculated by really executing the above encoding, the total code corresponding to the selected mode being stored in the FIFO memory 110 may be output to the buffer memory (not shown) instead of applying the selected difference macroblock data to the processor 101.

In this embodiment, the processor 74 (the smallest amount selection 74) shown in FIG. 13 may be substituted for the processor 34 (the closest to the set target selection 34).

In this embodiment, in the processor 45 (target estimation 45) may be added, and the quantizer scale q may be used instead of the above target value.

Figure 15:
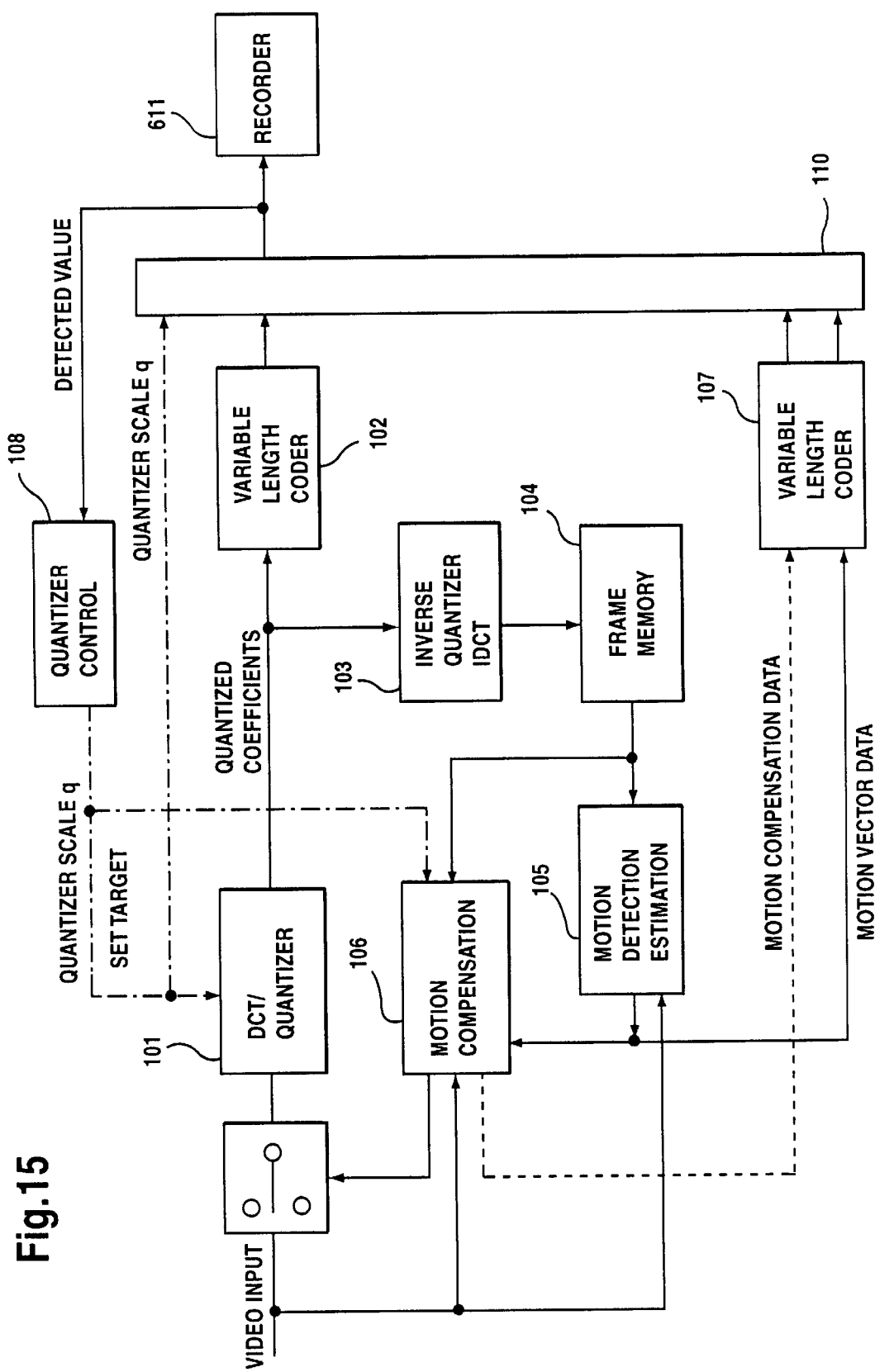
FIG. 15 is a block diagram of the fourth embodiment.

(9) Seventh Embodiment (FIG. 15)

As shown in FIG. 15, the present invention may be applied to the recorder. In this seventh embodiment, the current macroblock is encoded by using the coding mode that is selected as described above. That is, one of the techniques of the third to the sixth embodiment may be in use. Then, the coded data is recorded onto the recording medium such as an optical disc, a magneto-optical disc, a digital video disc and so on, by the recorder 611. The DCT and quantizer processor 101, the VLC processor 102, the inverse quantizer and inverse DCT processor 103, the frame memory 104, the motion detection and estimation processor 105, the motion compensation processor 106, the VLC processor 107, the quantizer control processor 108, and the FIFO memory 110 are employed in the technique of the seventh embodiment.

Figure 16:
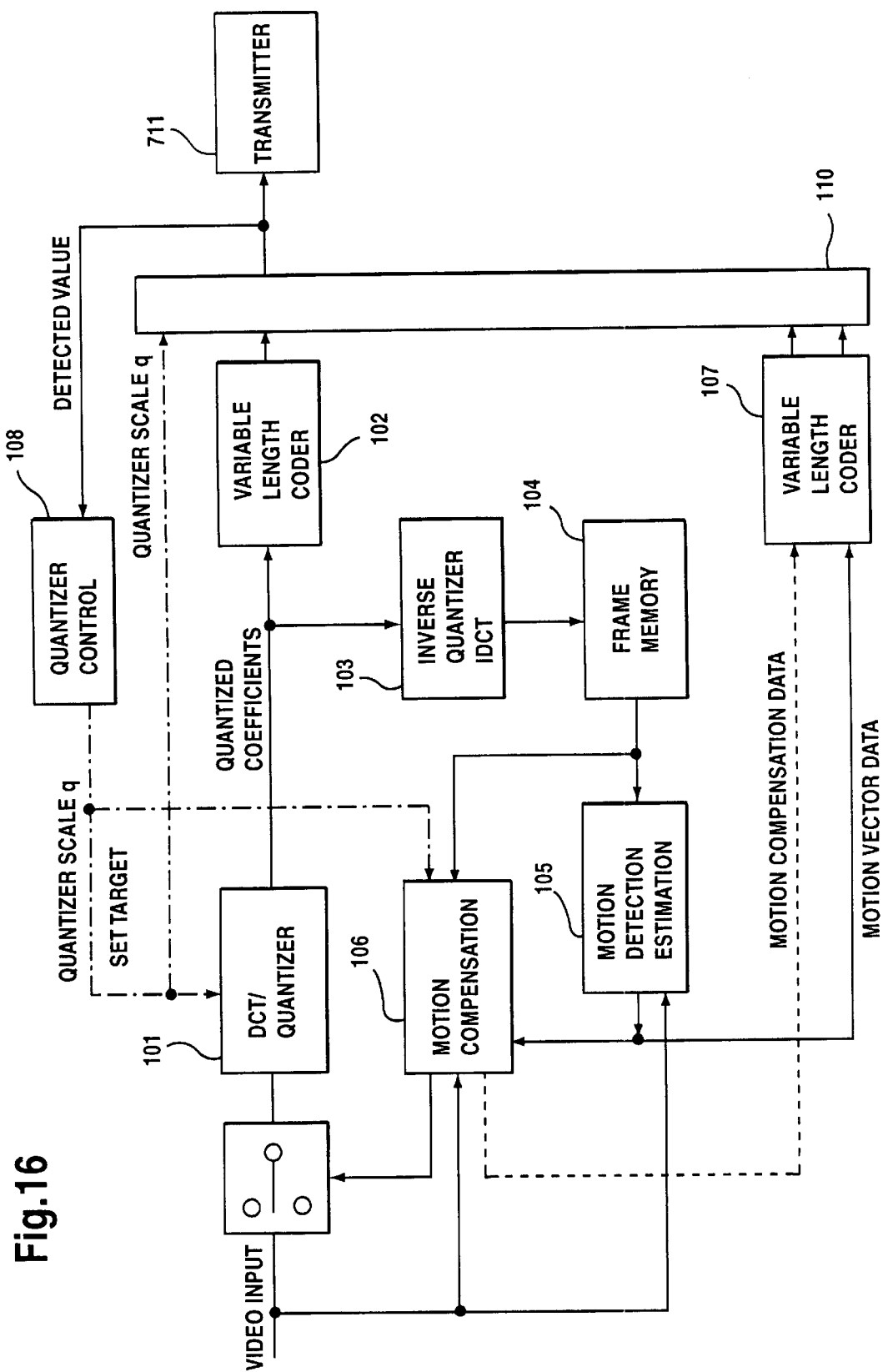
FIG. 16 is a block diagram of the fifth embodiment.

(10) Eighth embodiment (FIG. 16)

As shown in FIG. 1, the present invention may be applied to the transmitter. In this eighth embodiment, the current macroblock is encoded by using the coding mode that is selected as described above. That is, one of the techniques of the third to the sixth embodiment may be in use. Then, the coded data is transmitted to an external device, line, and so on, through the transmitter 711. The DCT and quantizer processor 101, the VLC processor 102, the inverse quantizer and inverse DCT processor 103, the frame memory 104, the motion detection and estimation processor 105, the motion compensation processor 106, the VLC processor 107, the quantizer control processor 108, and the FIFO memory 1 10 are employed in the technique of the seventh embodiment.

We claim:

1. An encoder for encoding current video data to generate compressed code by using a selected coding mode, the encoder comprising:
   a first determiner for determining a first value related to an amount of current video code derived from the current video data for each coding modes respectively;
   a first selector for selecting a coding mode with reference to the first values;
   a second determiner for determining a second value related to an amount of current video code derived from the current video data for each coding mode respectively;
   a second selector for selecting a coding mode with reference to the second values; and
   a third selector for selecting one of the selecting operations according to a degree of the compression.

2. An encoder for encoding current video data to generate compressed code by using a selected coding mode, the encoder comprising:
   a first determiner for determining a first value related to an amount of current video code derived from the current video data for each coding mode, respectively;
   an extractor for extracting the first values each of which meets a set condition;
   a first selector for selecting a coding mode corresponding to the extracted first value when only one first value is extracted;
   a second determiner for determining a second value related to an amount of current video code derived from the current video data for each of the coding modes corresponding to the extracted first values, respectively, when two or more first values are extracted;
   a second selector for selecting a coding mode with reference to the second values; and
   a setter for setting the condition according to a degree of the compression.

3. An encoder for encoding current video data to generate compressed code by using a selected coding mode, the encoder comprising:
   a first determiner for determining a predictive error for each coding mode, respectively;
   an extractor for extracting the predictive errors each of which less than a given threshold;
   a first selector for selecting a coding mode corresponding to the extracted predictive error when only one predictive error is extracted;
   a second determiner for determining a variance for each of the coding mode corresponding to the extracted predictive errors, respectively, when two or more predictive errors are extracted;
   a second selector for selecting a coding mode with reference to the variances; and
   a setter for setting the threshold according to a degree of the compression.

4. An encoder according to claim 1, wherein said compressing operation is performed by using a technique of discrete cosine transformation (DCT).

5. An encoder according to claim 2, wherein said compressing operation is performed by using a technique of discrete cosine transformation (DCT).

6. An encoder according to claim 3, wherein said compressing operation is performed by using a technique of discrete cosine transformation (DCT).

7. An encoder according to claim 1, wherein said compressing operation is performed by using a technique of quantization and wherein said degree of the compression is a quantizer scale.

8. An encoder according to claim 2, wherein said compressing operation is performed by using a technique of quantization and wherein said degree of the compression is a quantizer scale.

9. An encoder according to claim 3, wherein said compressing operation is performed by using a technique of quantization and wherein said degree of the compression is a quantizer scale.

10. An encoder according to claim 4, wherein said compressing operation is performed by using a technique of quantization and wherein said degree of the compression is a quantizer scale.

11. An encoder according to claim 5, wherein said compressing operation is performed by using a technique of quantization and wherein said degree of the compression is a quantizer scale.

12. An encoder according to claim 6, wherein said compressing operation is performed by using a technique of quantization and wherein said degree of the compression is a quantizer scale.

13. An encoder according to claim 1, wherein said encoder further comprises:
    a buffer memory for storing the generated compressed code; and
    a rate controller for controlling the degree of the compression according to the remaining capacity of the buffer memory.

14. An encoder according to claim 2, wherein said encoder further comprises:

a buffer memory for storing the generated compressed code; and a rate controller for controlling the degree of the compression according to the remaining capacity of the buffer memory.

15. An encoder according to claim 3, wherein said encoder further comprises:

a buffer memory for storing the generated comprised code; and a rate controller for controlling the degree of the compression according to the remaining capacity of the buffer memory.

16. An encoder according to claim 1, wherein said encoder further comprises:

a rate controller for controlling the degree of the compression according to an amount of the generated code.

17. An encoder according to claim 2, wherein said encoder further comprises:

a rate controller for controlling the degree of the compression according to an amount of the generated code.

18. An encoder according to claim 3, wherein said encoder further comprises:

a rate controller for controlling the degree of the compression according to an amount of the generated code.

19. A method of encoding current video data, which is an object to be encoded to corresponding current video code, by using a selected coding mode, the method comprising the steps of:

determining a first value related to an amount of total code for each predictive coding mode, each of the total code including current video code and its coding parameters;

determining a second value related to an amount of total code for an intra coding mode, the total code including current video code and its coding parameters; and selecting a coding mode with reference to the first values and a second value.

20. A method of encoding current video data, which is an object to be encoded to corresponding current video code, by using a selected coding mode, the method comprising the steps of:

calculating a difference data between the current video data and a reference data which is designated by each predictive coding mode;

determining a predictive error for each predictive coding mode;

extracting a predictive coding mode corresponding to the difference data having the smallest predictive error;

determining a value related to an amount of total code for the extracted predictive coding mode and for an intra coding mode, respectively, the total code including current video code and its coding parameters; and selecting a coding mode with reference to the determined two values.

21. A method of encoding current video data according to claim 19, wherein the selection is performed by selecting the value which is the closest to a given target value.

22. A method of encoding current video data according to claim 20, wherein the selection is performed by selecting the value which is the closest to a given target value.

23. A method of encoding current video data according to claim 19, wherein the selection is performed by selecting the smallest value.

24. A method of encoding current video data according to claim 20, wherein the selection is performed by selecting the smallest value.

25. A method of recording code onto a medium, the code being encoded from current video data by using a selected coding mode, the method comprising the steps of:

determining a first value related to an amount of total code for each predictive coding mode, each of the total code including current video code and its coding parameters;

determining a second value related to an amount of total code for an intra coding mode, the total code including current video code and its coding parameters; and selecting a coding mode with reference to the first values and a second value.

26. A method of recording code onto a medium, the code being encoded from current video data by using a selected coding mode, the method comprising the steps of:

calculating a difference data between the current video data and a reference data which is designated by each predictive coding mode;

determining a predictive error for each predictive coding mode;

extracting a predictive coding mode corresponding to the difference data having the smallest predictive error;

determining a value related to an amount of total code for the extracted predictive coding mode and for an intra coding mode, respectively, the total code including current video code and its coding parameters; and selecting a coding mode with reference to the determined two values.

27. A method of recording code onto a medium according to claim 25, wherein the selection is performed by selecting the value which is the closest to a given target value.

28. A method of recording code onto a medium according to claim 26, wherein the selection is performed by selecting the value which is the closest to a given target value.

29. A method of recording code onto a medium according to claim 25, wherein the selection is performed by selecting the smallest value.

30. A method of recording code onto a medium according to claim 26, wherein the selection is performed by selecting the smallest value.

31. A method of transmitting code, the code being encoded from current video data by using a selected coding mode, the method comprising the steps of:

determining a first value related to an amount of total code for each predictive coding mode, each of the total code including current video code and its coding parameters;

determining a second value related to an amount of total code for an intra coding mode, the total code including current video code and its coding parameters; and selecting a coding mode with reference to the first values and a second value.

32. A method of transmitting code, the code being encoded from current video data by using a selected coding mode, the method comprising the steps of:

calculating a difference data between the current video data and a reference data which is designated by each predictive coding mode;

determining a predictive error for each predictive coding mode;

extracting a predictive coding mode corresponding to the difference data having the smallest predictive error;

determining a value related to an amount of total code for the extracted predictive coding mode and for an intra coding mode respectively, the total code including current video code and its coding parameters; and selecting a coding mode with reference to the determined two values.

33. A method of transmitting code according to claim 31, wherein the selection is performed by selecting the value which is the closest to a given target value.

34. A method of transmitting code according to claim 32, wherein the selection is performed by selecting the value which is the closest to a given target value.

35. A method of transmitting code according to claim 31, wherein the selection is performed by selecting the smallest value.

36. A method of transmitting code according to claim 32, wherein the selection is performed by selecting the smallest value.

* * * * *